(12) United States Patent
Cavedo, Jr. et al.

(10) Patent No.: US 11,813,957 B2
(45) Date of Patent: *Nov. 14, 2023

(54) BATTERY CHARGING AND DISCHARGING DEVICE FOR A PLURALITY OF INDIVIDUAL BATTERIES

(71) Applicant: Plasan North America, Inc., Grand Rapids, MI (US)

(72) Inventors: John Rollings Cavedo, Jr., Spring Lake, MI (US); Brett Allyn Maki, Rockford, MI (US); Bradley Allen Pedersen, Boxford, MA (US); Daniel Francis Jakiela, Davisburg, MI (US); Christopher John McGann, Grand Rapids, MI (US)

(73) Assignee: Plasan North America, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,450

(22) Filed: Apr. 17, 2023

(65) Prior Publication Data

US 2023/0249577 A1 Aug. 10, 2023

Related U.S. Application Data

(63) Continuation of application No. 17/531,569, filed on Nov. 19, 2021.

(51) Int. Cl.
*B60L 53/80* (2019.01)
*H02J 7/00* (2006.01)
*B60L 53/18* (2019.01)
*H01M 50/236* (2021.01)
*H01M 50/24* (2021.01)

(52) U.S. Cl.
CPC ............... *B60L 53/80* (2019.02); *B60L 53/18* (2019.02); *H01M 50/236* (2021.01); *H01M 50/24* (2021.01); *H02J 7/0045* (2013.01); *H02J 7/00047* (2020.01); *H02J 7/0048* (2020.01)

(58) Field of Classification Search
CPC ....................................................... B60L 53/80
USPC ......................................................... 320/107
See application file for complete search history.

(56) References Cited

U.S. PATENT DOCUMENTS

| 4,664,967 A * | 5/1987 | Tasdemiroglu ....... F41H 5/0464 |
| | | 89/36.01 |
| 2011/0014501 A1* | 1/2011 | Scheucher ............ B60L 3/0046 |
| | | 429/7 |

(Continued)

*Primary Examiner* — Jerry D Robbins
(74) *Attorney, Agent, or Firm* — Donald Lecher; BUTZEL LONG

(57) ABSTRACT

A battery charging and discharging device includes an enclosure defining an interior compartment, where the enclosure further includes an access opening configured to allow access to the interior compartment, a moveable cover configured to move between a closed position covering the access opening and to prevent access to the interior compartment, and an open position enabling access to the interior compartment, a battery storage compartment disposed within the interior compartment and configured to receive, retain and release a plurality of rechargeable batteries, and a releasable attachment device configured to releasably attach the enclosure to one of a movable object or a stationary fixture.

25 Claims, 13 Drawing Sheets

(56) References Cited

U.S. PATENT DOCUMENTS

| | | | |
|---|---|---|---|
| 2013/0030581 A1* | 1/2013 | Luke | B60L 7/06 |
| | | | 705/14.1 |
| 2015/0268009 A1* | 9/2015 | Tunis, III | F41H 5/013 |
| | | | 89/36.02 |
| 2016/0322839 A1* | 11/2016 | Fan | H02J 7/0029 |
| 2017/0327091 A1* | 11/2017 | Capizzo | C25B 9/17 |
| 2018/0241237 A1* | 8/2018 | Kemmann | H02J 9/04 |
| 2021/0021139 A1* | 1/2021 | Windsor | H02J 7/0063 |
| 2022/0320881 A1* | 10/2022 | Zaitsu | H01M 10/46 |
| 2022/0348108 A1* | 11/2022 | Hajimiri | B60L 58/18 |
| 2022/0371463 A1* | 11/2022 | Stubbs | H02J 7/0013 |

* cited by examiner

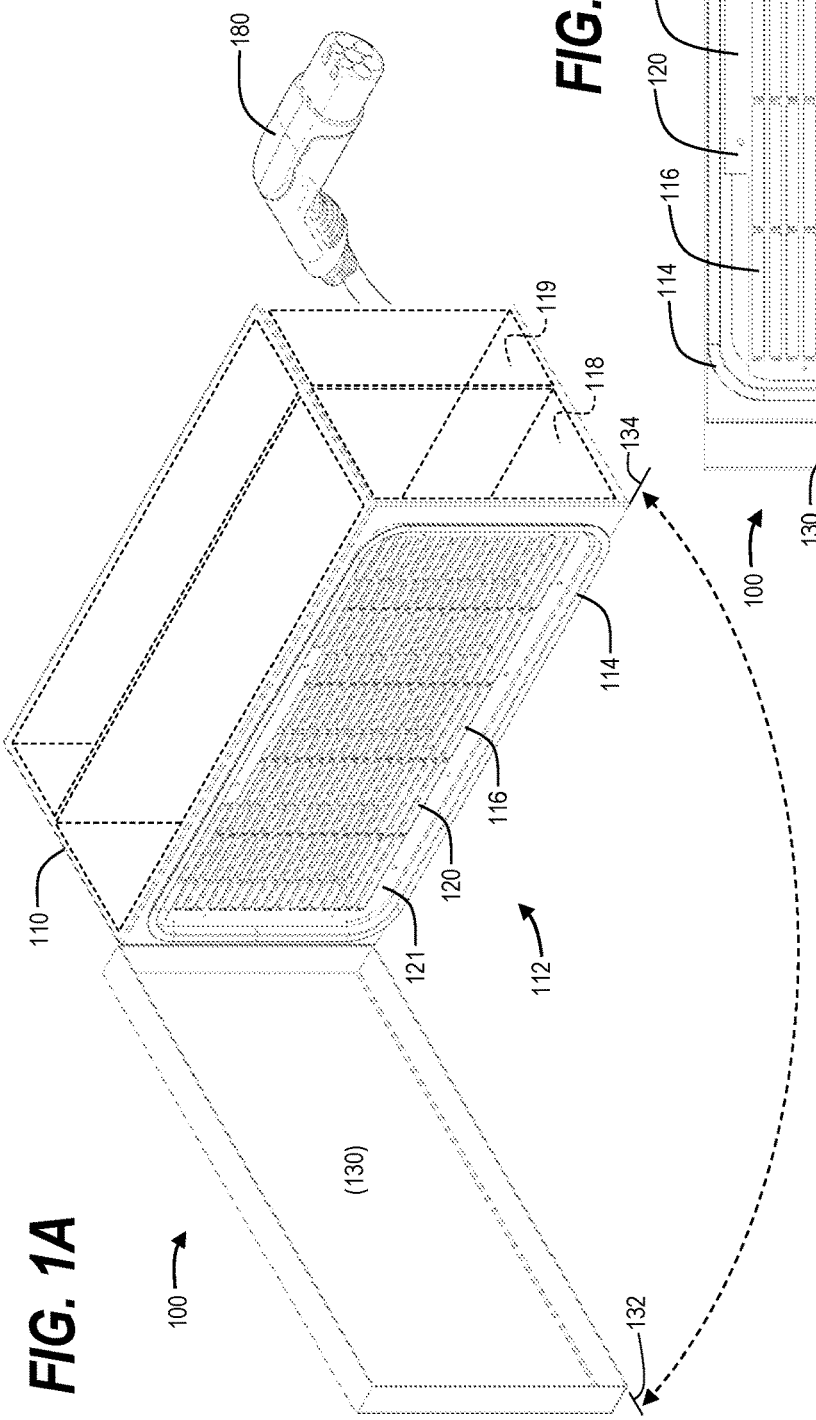
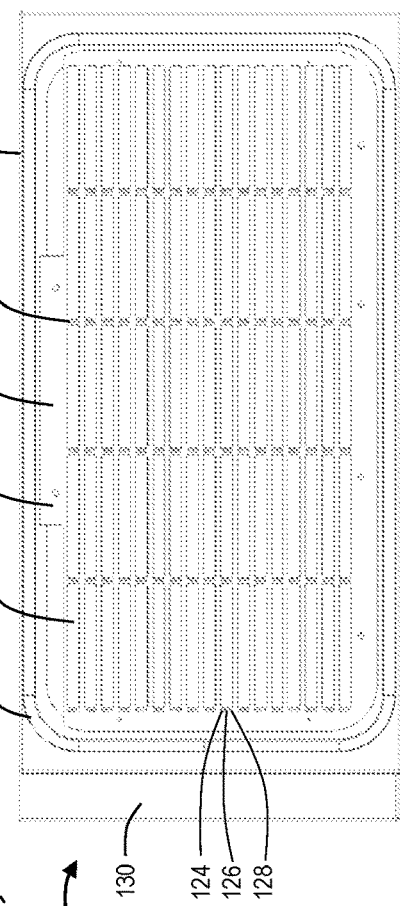

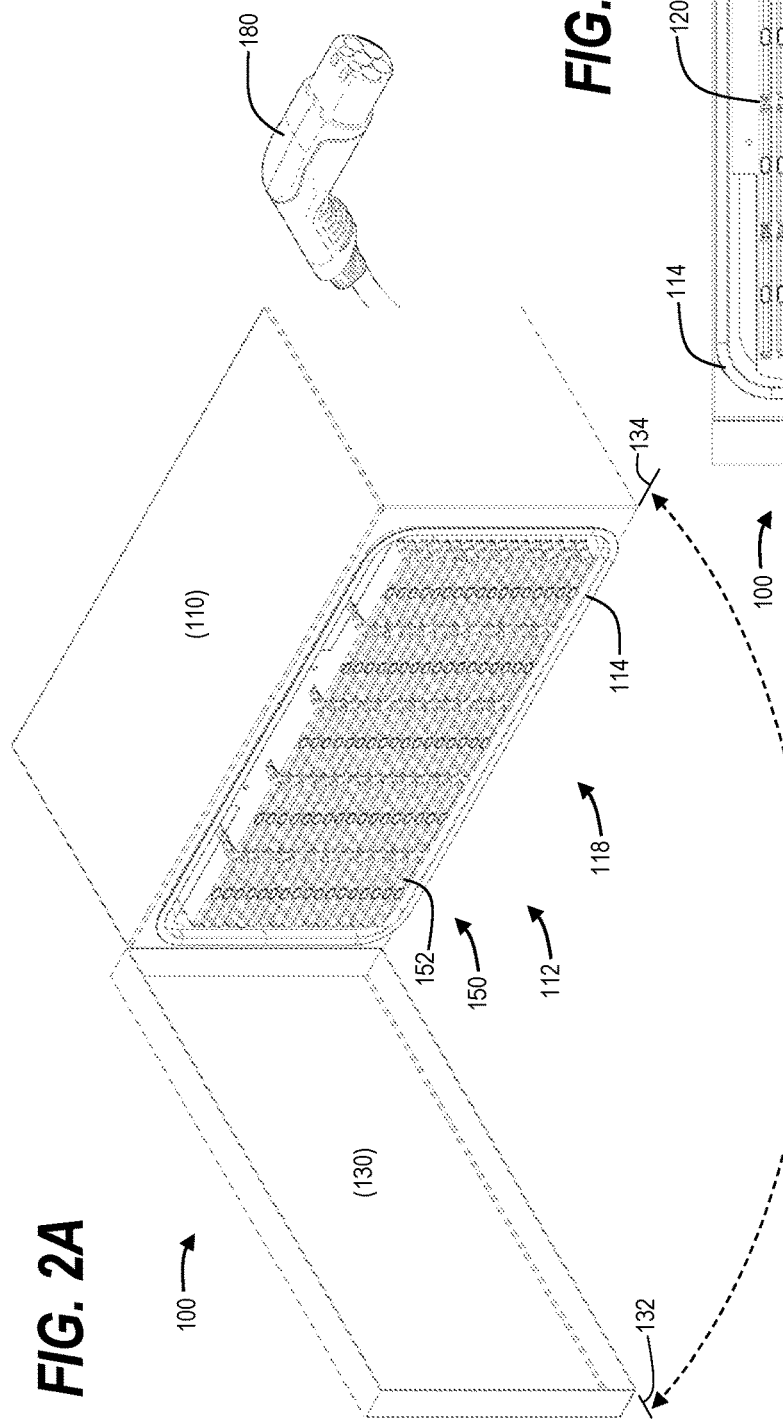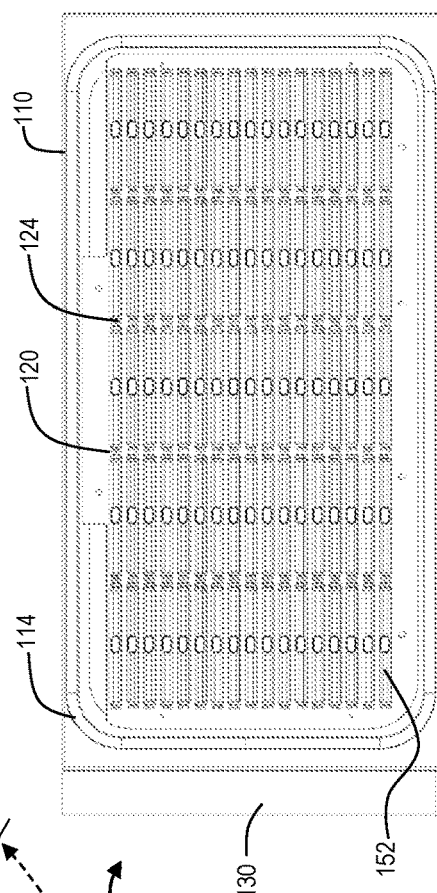

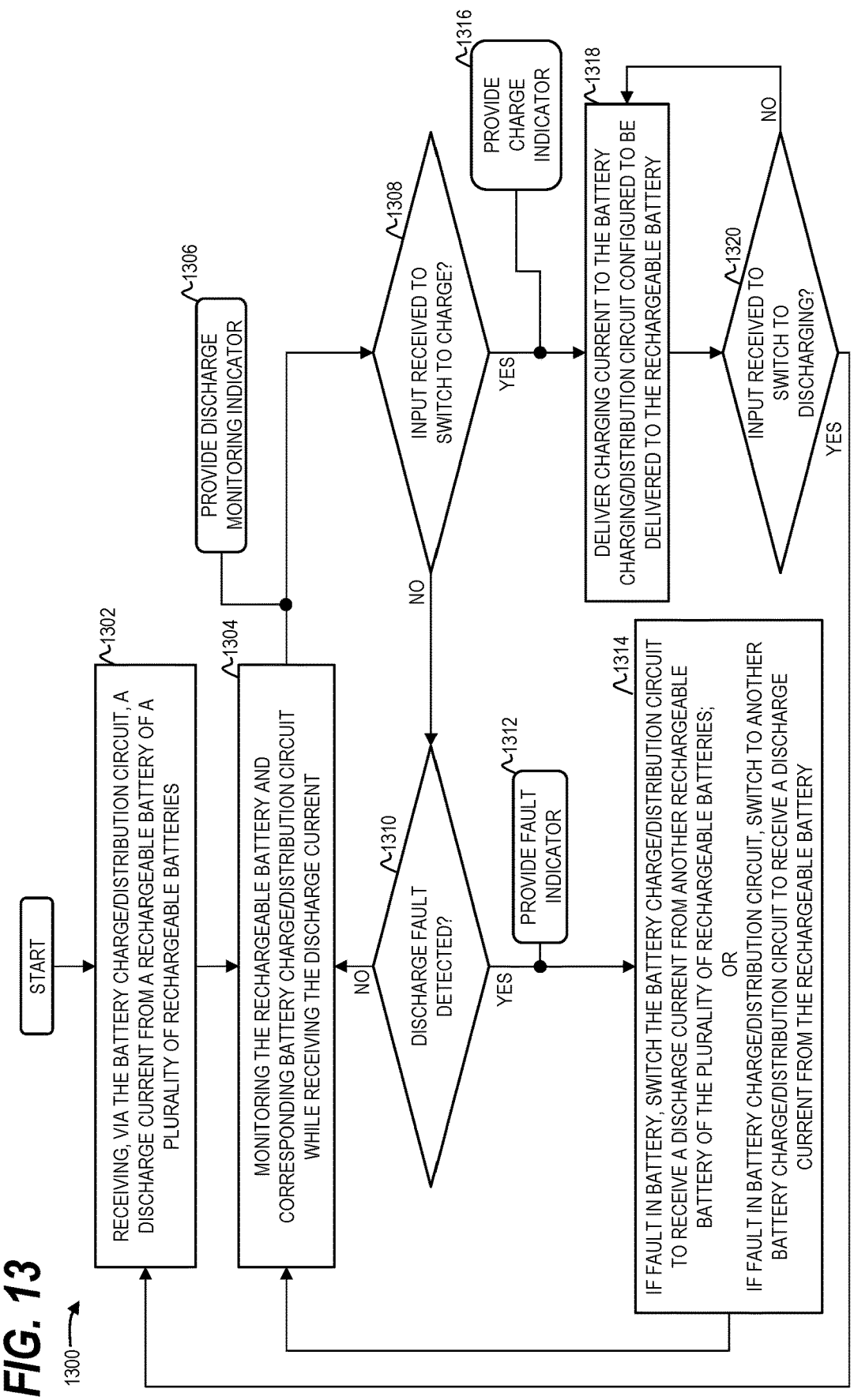

BATTERY CHARGING AND DISCHARGING DEVICE FOR A PLURALITY OF INDIVIDUAL BATTERIES

RELATED APPLICATIONS

This application is a continuation application and claims benefit of U.S. Non-Provisional Utility patent application Ser. No. 17/531,569, filed on Nov. 19, 2021. The disclosure of the application listed above is incorporated herein by reference in its entirety.

BACKGROUND

This disclosure is directed toward an apparatus for charging and discharging at least one of a plurality of individual rechargeable batteries, and a method for charging and discharging at least one of a plurality of individual rechargeable batteries.

TECHNICAL FIELD

Military communities are currently in the process of developing Conformal Wearable Batteries (CWB) designed as a safe, flexible and wearable power source to meet current and future needs of armed service members carrying portable/wearable systems, e.g., communication systems and weapons systems, into training and combat theatres. Additionally, not only warfighter-worn CWBs exist in ever increasing number in the field, but also other non-wearable device-specific rechargeable batteries associated with portable and field-operable electronic systems.

There exists a need for a portable rechargeable and dischargeable battery device capable of recharging CWB and non-CWB rechargeable batteries in the field using a common power supply and a dense, or high battery count per charging device, charging structure.

Additionally, there exists a need for portable in-the-field power that may be supplied by the portable rechargeable and dischargeable battery device when one or more batteries retained in the device are switched to deliver their corresponding battery power, (and may in consonant with battery power from other retained batteries), configured to deliver the consolidated battery power to an internal or an external electrical load.

In addition, there exists a need to configure the rechargeable battery charging device to have modular battery storage compartments or bays pre-configured to receive, retain and release any number of rechargeable batteries in any number of predetermined form factors or sizes.

BRIEF SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein a battery charging and discharging device includes an enclosure defining an interior compartment, where the enclosure further includes an access opening configured to allow access to the interior compartment, a moveable cover configured to move between a closed position covering the access opening and to prevent access to the interior compartment, and an open position enabling access to the interior compartment, a battery storage compartment disposed within the interior compartment and configured to receive, retain and release a plurality of rechargeable batteries, and a releasable attachment device configured to releasably attach the enclosure to one of a movable object or a stationary fixture.

The above embodiment further includes a power management system disposed within the interior compartment further including a plurality of battery charge and distribution circuits each configured to switch between a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and a battery power supplying mode configured to receive a stored battery power from at least one of the plurality of rechargeable batteries retained in the battery storage compartment and configured to deliver the stored battery power to an external electrical load, and a battery charging monitoring circuit configured to monitor at least one battery of the plurality of rechargeable batteries under the battery charging mode and provide a charging state visual indicator of the monitored battery charging mode associated with the at least one monitored battery, and to switch at least one of the plurality of battery charge and distribution circuits supplying the charging current between one of the first and the second rechargeable batteries.

In another embodiment disclosed herein a battery charging and discharging device includes an enclosure defining an interior compartment, the enclosure further including an access opening configured to allow access to the interior compartment, a moveable cover configured to move between a closed position covering the access opening and to prevent access to the interior compartment, and an open position enabling access to the interior compartment, a battery storage compartment disposed within the interior compartment and configured to receive a first battery storage bay module configured to receive, retain and release a first type of a plurality of rechargeable batteries and to receive a second rechargeable battery storage bay module configured to receive, retain and release a second type of the plurality of rechargeable batteries different from the first type of the plurality of rechargeable batteries, and a releasable attachment device configured to releasably attach the enclosure to one of a movable object or a stationary fixture.

The above embodiment further includes a power management system disposed within the interior compartment further including a plurality of battery charge and distribution circuits each configured to switch between a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and a battery power supplying mode configured to receive a stored rechargeable battery power from at least one of the plurality of rechargeable batteries retained in the battery storage compartment and configured to deliver the stored rechargeable battery power to an external electrical load, and a battery charging monitoring circuit configured to monitor at least one battery of the plurality of rechargeable batteries under the battery charging mode and provide a visual indicator of the monitored battery charging mode associated with the at least one battery, and to switch at least one of the plurality of battery charge and distribution circuits supplying the charging current between one of the first and the second rechargeable batteries.

In another embodiment disclosed herein a battery charging and discharging device includes a battery storage compartment configured to receive, retain and release a plurality of rechargeable batteries, and a power management system including a plurality of battery charge and distribution circuits each configured to switch between a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and a battery power supplying mode configured to receive a stored rechargeable battery power from at least one of the plurality of rechargeable batteries retained in the battery storage compartment and configured to deliver the stored rechargeable battery power to an external electrical load, and a battery charging monitoring circuit configured to monitor at least one battery of the plurality of rechargeable batteries under the battery charging mode and provide a visual indicator of the monitored battery charging mode associated with the at least one battery, and to switch at least one of the plurality of battery charge and distribution circuits supplying the charging current between one of the first and the second rechargeable batteries.

In another embodiment disclosed herein a method of charging and distributing power between a plurality of rechargeable batteries includes providing a battery charging circuit configured to supply a charging current at a first time to a first rechargeable battery of the plurality of rechargeable batteries, and to provide the charging current at a second time to a second rechargeable battery of the plurality of rechargeable batteries, supplying the charging current at the first time to the first rechargeable battery of the plurality of rechargeable batteries, switching, at the second time, the battery charging circuit to supply the charging current to the second rechargeable battery of the plurality of rechargeable batteries, providing a battery power supplying circuit configured to receive a stored rechargeable battery power from at least one of the plurality of rechargeable batteries, and to deliver the stored rechargeable battery power to an electrical load, and switching between one of supplying the charging current to one of the first rechargeable battery or the second rechargeable battery of the plurality of rechargeable batteries, and receiving the stored battery power from the one of the first rechargeable battery or the second rechargeable battery of the plurality of rechargeable batteries to enable delivery of the received stored battery power to the electrical load.

In another embodiment disclosed herein a method of charging and distributing power between a plurality of rechargeable batteries connected to a power management circuit includes providing a battery charging circuit configured to be connected to at least two of the plurality of rechargeable batteries, supplying, via the battery charging circuit, a charging current to a first rechargeable battery of the plurality of rechargeable batteries, monitoring the first rechargeable battery while receiving the supplied charging current, detecting a charging fault in response to monitoring the first rechargeable battery receiving the supplied charging current, switching, in response to the detected charging fault of the first battery, the battery charging circuit to supply the charging current via to the second rechargeable battery of the plurality of rechargeable batteries, providing a battery discharge circuit configured to receive a stored rechargeable battery power from at least one of the plurality of rechargeable batteries, detecting a first user input to cause the at least one of the plurality of rechargeable batteries to discharge stored rechargeable battery power to an electrical load, and receiving a second input to cause the at least one of the plurality of rechargeable batteries to receive, via the battery charging circuit, the charging current.

In another embodiment disclosed herein a method of charging and distributing power between a plurality of rechargeable batteries connected to a power management circuit includes supplying, via a battery charge and distribution circuit, a charging current to at least one of a plurality of rechargeable batteries, monitoring, via a monitoring circuit, the at least one of the plurality of rechargeable batteries and the battery charge and distribution circuit concurrently with supplying the charging current, and at least one of 1) determining, by the monitoring circuit, a charging fault in the at least one of the plurality of rechargeable batteries, and based on determining the charging fault in the at least one of the plurality of rechargeable batteries, switching the battery charge and distribution circuit to supply the charging current to another one of the plurality of rechargeable batteries, and 2) determining, by the monitoring circuit, a charging fault in the battery charge and distribution circuit, and based on determining the charging fault in the battery charge and distribution circuit, switching to another battery charge and distribution circuit to supply the charging current to the at least one of the plurality of rechargeable batteries.

In another embodiment disclosed herein a method of charging and distributing power between a plurality of rechargeable batteries connected to a power management circuit including receiving, via a battery charge and distribution circuit, a discharge current from at least one of a plurality of rechargeable batteries, monitoring, via a monitoring circuit, the at least one of the plurality of rechargeable batteries and the battery charge and distribution circuit concurrently receiving the discharge current, and at least one of 1) determining, by the monitoring circuit, a discharge fault in the at least one of the plurality of rechargeable batteries, and based on determining the discharge fault in the at least one of the plurality of rechargeable batteries, switching the battery charge and distribution circuit to receive another discharge current from another of the plurality of rechargeable batteries, and 2) determining, by the monitoring circuit, a discharge fault in the battery charge and distribution circuit, and based on determining the discharge fault in the battery charge and distribution circuit, switching to another battery charge and distribution circuit to receive the discharge current from the at least one of the plurality of rechargeable batteries.

BRIEF DESCRIPTION OF THE SEVERAL VIEWS OF THE DRAWINGS

The embodiments will be better understood from the following detailed description with reference to the drawings, which are not necessarily drawing to scale and in which:

FIG. 1A illustrates a perspective view of a first embodiment of a battery charging and discharging device;

FIG. 1B illustrates a front view of the first embodiment of a battery charging and discharging device of FIG. 1A;

FIG. 2A illustrates a perspective view of the first embodiment of a battery charging and discharging device of FIGS. 1A-1B containing a plurality of batteries loaded within an internal compartment of an enclosure of the battery charging and discharging device;

FIG. 2B illustrates a front view of the first embodiment of a battery charging and discharging device of FIGS. 1A-2A containing the plurality of batteries loaded within the internal compartment of the enclosure of the battery charging and discharging device;

FIG. 13 illustrates a logic flowchart diagram of a method of supplying stored battery energy current from at least one battery of a plurality of batteries to an electrical load by either switching from a first battery charge/distribution circuit to another battery charge/distribution circuit, or switching from a first discharging rechargeable battery to another discharging rechargeable battery.

DETAILED DESCRIPTION

Figure 3:
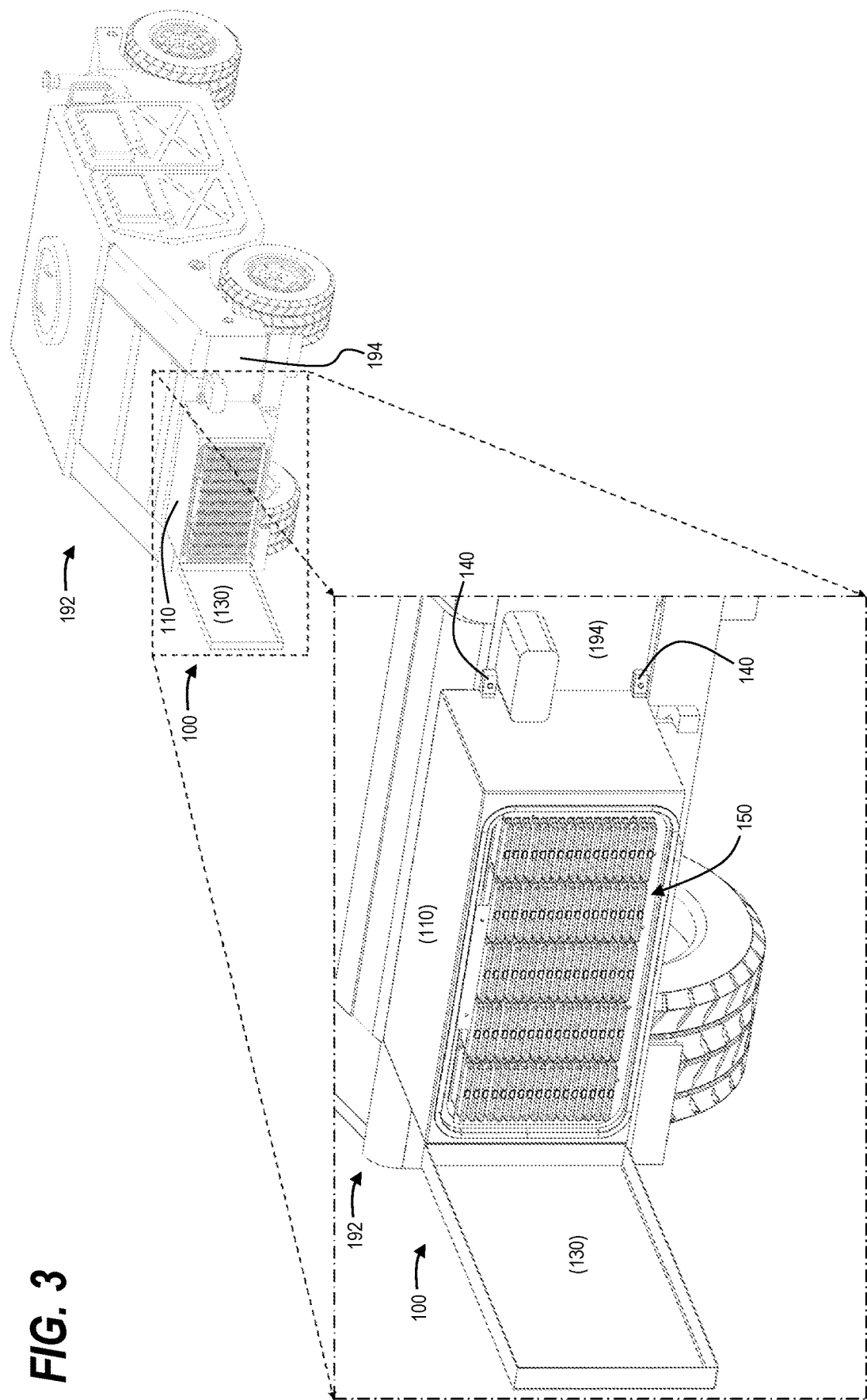
FIG. 3 illustrates an environmental illustration of the battery charging and discharging device of FIGS. 1A-2B containing the plurality of batteries loaded within the internal compartment of the enclosure of the battery charging and discharging device as affixed to an external surface of a moveable vehicle.

The embodiments describe herein are directed toward a device and methods for charging and discharging a plurality of rechargeable batteries in a dense form factor. The charging and discharging device may be configured to enable bi-directional AC-DC and DC-DC charging and discharging between an electrical source and a plurality of batteries that may include batteries conforming to the standard for Conformable Wearable Batteries (CWB) (MIL-PRF-32383/4A). The bi-directional nature of the power flow may be configured to both charge rechargeable batteries retained in the device or to act as a battery bank and provide stored power from the rechargeable battery array when connected to internal or external electrical loads relative to the charging and discharging device.

The charging and discharging device may be generally configured to include a plurality of slots/receptacles to hold rechargeable batteries and provide electrical contacts to interface with the external rechargeable battery contacts configured to both charge and discharge the batteries.

The charging and discharging device may be further configured to provide a power management system to support the charging and discharging of any batteries within the enclosure using a charging current type of, e.g., 110 VAC, 220 VAC, 480 VAC, 12 VDC, 24 VDC, 350 VDC nominal, 650 VDC nominal and 800 VDC nominal, wherein the power management system provides universal translation of both input and output power standards/protocols within current armed forces vehicle and power infrastructure fleets.

The power management system of the charging and discharging device further includes a cooling system configured to as at least one of an air-to-air heat exchanger, an air-to-liquid heat exchanger, and a heat pump-type refrigerant cooling system.

The charging and discharging device may be configured either as a weather-proof enclosure or a structure configured to be mounted within an existing weather-proof enclosure, either mobile or stationary, and may be configured in a size-based modular manner to charge or discharge batteries in a quantity of, e.g., 40-200 rechargeable batteries at a time, whether CWB or non-CWB batteries.

The charging and discharging device may be configured to be supported on a locking slide-out rack to maximize a quantity of batteries to be charged when attached, either externally to or internally within a moveable vehicle. The corresponding enclosure and power electronics of the charging and discharging device may also be qualified under MIL-STD 810G, ENVIRONMENTAL ENGINEERING PROGRAM GUIDELINES.

The following disclosure regarding the charging and discharging device and associated methods of operation generally describes the following three State Modes that may be used in combination or in the alternative to the embodiments described herein: a (1) Battery Charge Mode; a (2) Battery Hold or Standby Mode; and a (3) Offboard Power Mode.

(1) Battery Charge Mode

A Battery Charge Mode, as applied to any of the embodiment described herein, enables electrical power to flow from an external power source to a charging device, e.g., at least one rechargeable battery. The electrical power source may include AC or DC power formats, which within the charging device, may be identified, transformed, rectified and regulated into a predetermined format optimal to provide a charging current to each of the discrete battery charging circuits electrically connected to respective rechargeable batteries. Electrical power, as the charge current, may be supplied from an external power input source after being verified that a completed and safe connection has been made before closing contacts to allow the externally provided power to flow into any of the embodiments of charging device disclosed herein. Once the power management system of the disclosed device determines the incoming power and current type, and that a proper and safe connection has been made, the electrical contacts close and electrical power flows into the device to connected rechargeable batteries. After the power type has been identified, further intelligent circuits may boost, buck, rectify, regulate or otherwise modify the charging current to a predetermined input voltage and current type corresponding to the rechargeable batteries. This intelligent infrastructure selects the most efficient transformation to modify the input power to the desired charge current.

The power management system may be comprised of sister nodes operating in parallel under a master-less control algorithm. Each sister node is dedicated to charging either one battery or one array of batteries. Nodes are also capable of charging at least a second battery or at least a second array of batteries. These sister nodes operate in conjunction with each other to both switch between batteries receiving charging current and supplying stored energy and switch between charge and distribution circuits supplying charging current and receiving stored energy.

The power management system further determines and regulates a charge rate for each of the plurality of batteries inserted into the charging device under a charging state, (based on an overall level of energy available to the charge device), the quantity of batteries inserted into the charge device, the state of charge of each battery, (i.e., if charged with a low power demand, or uncharged with a high power demand), and the health status of each sister node.

The ability for sister nodes to be able to charge more than one battery or more than one array of batteries may be based on monitoring and detecting a failed or compromised performing node and notifying the power management system of the node's state such that the failed or compromised node may be temporarily or permanently electronically disconnected from the charging and discharging device or from the a local array of batteries with which it may be associated, while a neighboring or associated sister node takes over the charging operation for the failed/compromised battery or node that the initial battery or initial array was associated with.

The nodal redundancy prevents aging sister nodes that are working intermittently, inefficiently or not at all from receiving a partial charge from the charge device while the device may be remote from replacement parts and service operations.

In such a failed/compromised state, where a sister node has indicated an error in operation, a visual error indication is triggered reflecting the status of the charge device/or the particular node having the failed/compromised state. For example, a visual indication status may depict "still operational, but service soon" level of urgency, or depict a complete failure state. However, the overall capability and performance of the entire charging and discharging device would not be jeopardized in given the failure of a single, or even multiple nodes given the redundant nodal arrangement described above.

The relationship of a sister node to a battery within a charge array may be to monitor voltage, current, and power direction. This monitoring may detect spikes in current or voltage, detect under or over voltage/current conditions, and perform a rudimental battery health check, (e.g., in a pre-charging state), on a battery when it is inserted before charging may begin. The monitoring may be used to prevent a failed battery charge event, indicate that a battery cannot be charged due to an internal failure issue, halt charging of a damaged battery based on charging symptoms during a charging process that may not demonstrate any symptoms until the charging process is underway, and other battery charging safety metrics and measures. These results are communicated to an end user of the charge device via a visual indicator/indication that corresponds to each battery in the charge array.

(2) Battery Hold/Standby Mode

In the Battery Hold/Standby Mode, the charging and discharge device is neither providing nor accepting power where electrical contacts may be in an open state and charge monitoring circuitry may remain in an unpowered state. The Standby Mode may be configured to safely store batteries retained in the charging and discharging device by using energy to monitor them resulting in no reduction of a battery charge. An example of use in the Standby Mode may be where a charging and discharging device having plurality of completely charged rechargeable batteries that may be transported at a supply release point for subsequent retrieval. Continuing this example, the retrieval process might exchange one or more charging and discharging devices of fully charged batteries for a corresponding set of charging and discharging devices containing charge-depleted batteries.

(3) Offboard Power Mode

In the Offboard Power Mode, the charge device functions very similarly to the reverse of Charging Mode. For example, 1) the desired output power format may be configured/determined, 2) a safe and robust electrical connection has been made and confirmed, 3) the charge device verifies it has enough stored electrical energy to produce the desired output, and 4) contacts to the batteries close, and the charge device functions as a standalone power source. Error detection and safety verification in 2), above, is needed to determine the presence or absence of, e.g., a shorted input, or a scenario where there may not be enough batteries inserted with enough stored energy to effectively provide the requested power output to an electrical load.

Sister charge nodes control the power draw from the batteries keeping the current drawn within the safe operational parameters of the rechargeable batteries. Nodes behave again in parallel, with capability to pull power from one another or from another battery array should one battery or a first array of batteries fail or are compromised in performance. Communication may be master-less with the other nodes and the remainder of the intelligent power electronics within the charge device. Nodes feed power to the outbound power electronics which may boost, buck, and invert power to meet the desired output power.

A visual indicator may provide the user with a state of charge of the overall charge device. Intelligent outbound current monitoring enables the charge device to prevent an overcurrent condition on its internal hardware and/or the batteries inserted that supply the power. This logic/monitoring tracks at least one of voltage, voltage-sag, current, lead temperatures and may protect the charge device in a fault or overdraw situation.

FIG. 1A illustrates a perspective view of a first embodiment of a battery charging and discharging device 100, and FIG. 1B illustrates a front view of the first embodiment of the battery charging and discharging device 100 of FIG. 1A.

The battery charging and discharging device 100 includes a weather-proof enclosure 110 having an access opening 112 with a weather-seal 114 surrounding the perimeter of the access opening 112. An interior compartment 116 may be further defined by the battery charging and discharging enclosure 100 configured to house an interior battery storage compartment 118 and an interior battery charging and discharging equipment storage compartment 119.

The interior compartment 116 may be further configured to receive a battery storage bay 120 in at least a portion of the battery storage compartment 118, wherein the battery storage bay 120 includes a plurality of battery storage bay support members 121 configured to individually receive and retain one or a plurality of rechargeable batteries 150 (later shown in FIGS. 2A-2B).

The battery storage bay 120 may also include a charging state visual indicator 124 for each battery receptacle for the plurality of batteries that gives an indication of a charging state for an inserted battery, e.g., a Light Emitting Diode (LED) giving a red color for a low charge state, an amber color for an intermediate charge state, a green color for a high charge state, and a blinking color for a completed charge state indicator. The charging and discharging device may use the indicator LED's in additional ways to communicate information to the end user regarding, for example, device performance, energy flow, and error state(s).

The battery storage bay 120 may also include a charging/discharging state indicator 126 for each battery receptacle for the plurality of batteries that gives a visual indication, e.g., via an LED, when an inserted battery in a charging mode is being charged or when the battery in a discharge mode is be being discharged to supply power to an internal or an external source. The charging/discharging state indicator 126 may be incorporated into the charging state visual indicator to provide a single indicator element while providing another different color, e.g., blue, to indicate a battery in a discharge state as differentiated from the battery charge state indication. The battery storage bay 120 may also include a charge/discharge state switch 128 that may be user accessible from the access opening 112 to allow a user to select at least one or a plurality of batteries from any batteries retained in the battery charging and discharging enclosure 110 to be in either a charging state or a discharging state.

A moveable cover 130 may be configured to move between an open position 132 enabling access to the access opening 112 and the interior compartment 116 therethrough, and a closed position 134 providing a weather-proof sealing of the interior compartment 116 by means of the moveable cover 130 fully engaging the weather-seal 114 around the perimeter of the access opening 112.

Figure 7:
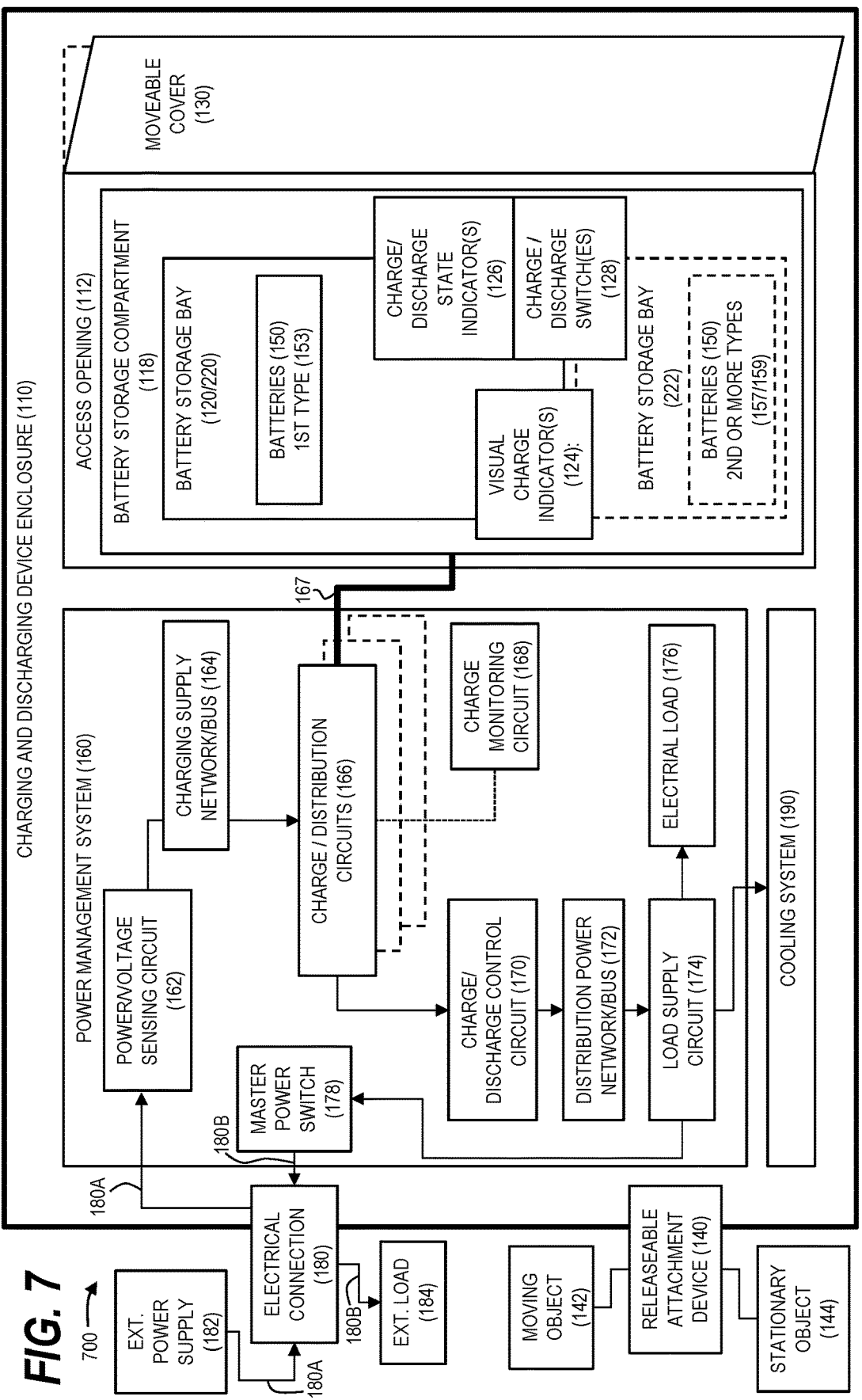
FIG. 7 illustrates a schematic diagram of the first and second embodiments of the charging and discharging device of FIGS. 1-6 included an enclosure and at least one battery storage bay module.
Figure 10:
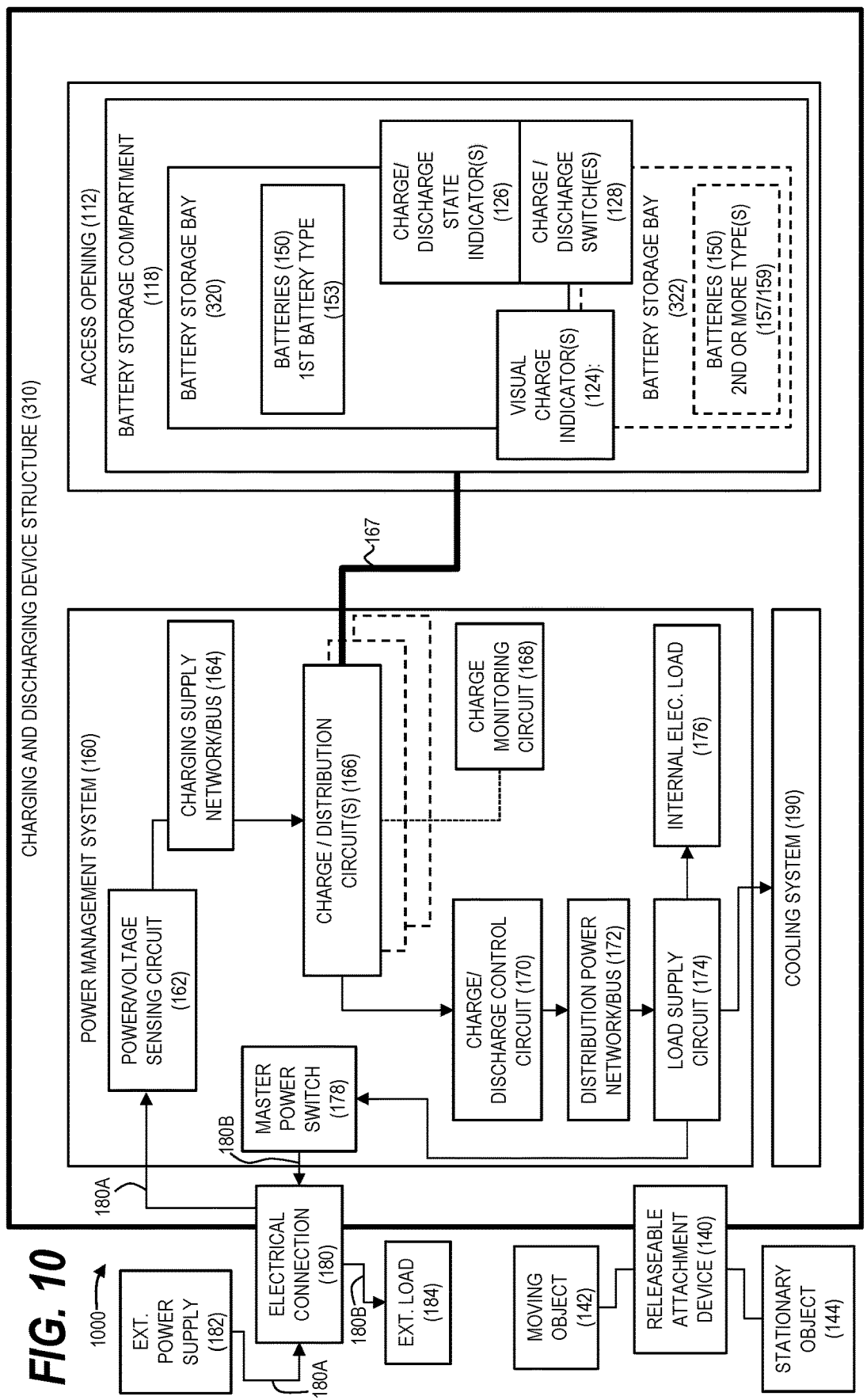
FIG. 10 illustrates a schematic diagram of the third embodiment of the charging and discharging device of FIGS. 8A-9 included an enclosure and at least one battery storage bay module.

The battery charging and discharging enclosure 110 may further include an external electrical connection 180 either attached to or protruding from the enclosure 110 configured to be electrically connected to at least an external power supply 182, (see FIGS. 7 and 10), and/or to at least one external electrical load 184, (see FIGS. 7 and 10). The external electrical connection may also include discrete electrical connections for each of the external power supply 182 and the external load 184 as external connection from power supply 180A and an external connection to load 180B as depicted in FIGS. 7 and 10.

FIG. 2A illustrates a perspective view and FIG. 2B illustrates a front view of the first embodiment of the battery charging and discharging device 100 of FIGS. 1A-1B containing a plurality of batteries 150 loaded within the interior compartment 116 of the enclosure 110 of the battery charging and discharging device 100. A first rechargeable battery 152 may have a form factor similar to the remaining plurality of rechargeable batteries 150. The first rechargeable battery 152 may be a type of battery referred to as a Conformable Wearable Battery (CWB) used by armed services members for supplying electrical energy to electrically powered tactical gear and weapon systems. The first rechargeable battery 152 may also include any other individually chargeable battery as differentiated from permanently pre-wired arrays of individual rechargeable batteries often referred to as battery packs.

FIG. 3 illustrates an environmental illustration of the battery charging and discharging device 100 of FIGS. 1A-2B containing the plurality of batteries 150 loaded within the interior compartment 116 of the enclosure 110, where the battery charging and discharging device 100 is illustrated as being affixed to an external surface 194 of a moveable vehicle 192 and connected via the external electrical connection 180 of FIGS. 1A and 2A to at least one of an electrical charging source provided by the moveable vehicle 192 and/or an external electrical load associated with the moveable vehicle 192.

The battery charging and discharging enclosure 100 may be maintained on the external surface 194 of the moveable vehicle 192 by at least one portion of a releasable attachment device 140 affixed to the external surface of the enclosure 110 and a corresponding portion of the releasable attachment device 140 configured to be secured to the external surface 194 of the moveable vehicle 192. The releasable attachment configuration of the battery charging and discharging enclosure 110 enables the removal of the battery charging and discharging device 100 from an attached object, whether moveable or stationary, to transport the battery charging and discharging device 100 independently to another moveable or stationary device.

Figure 4:
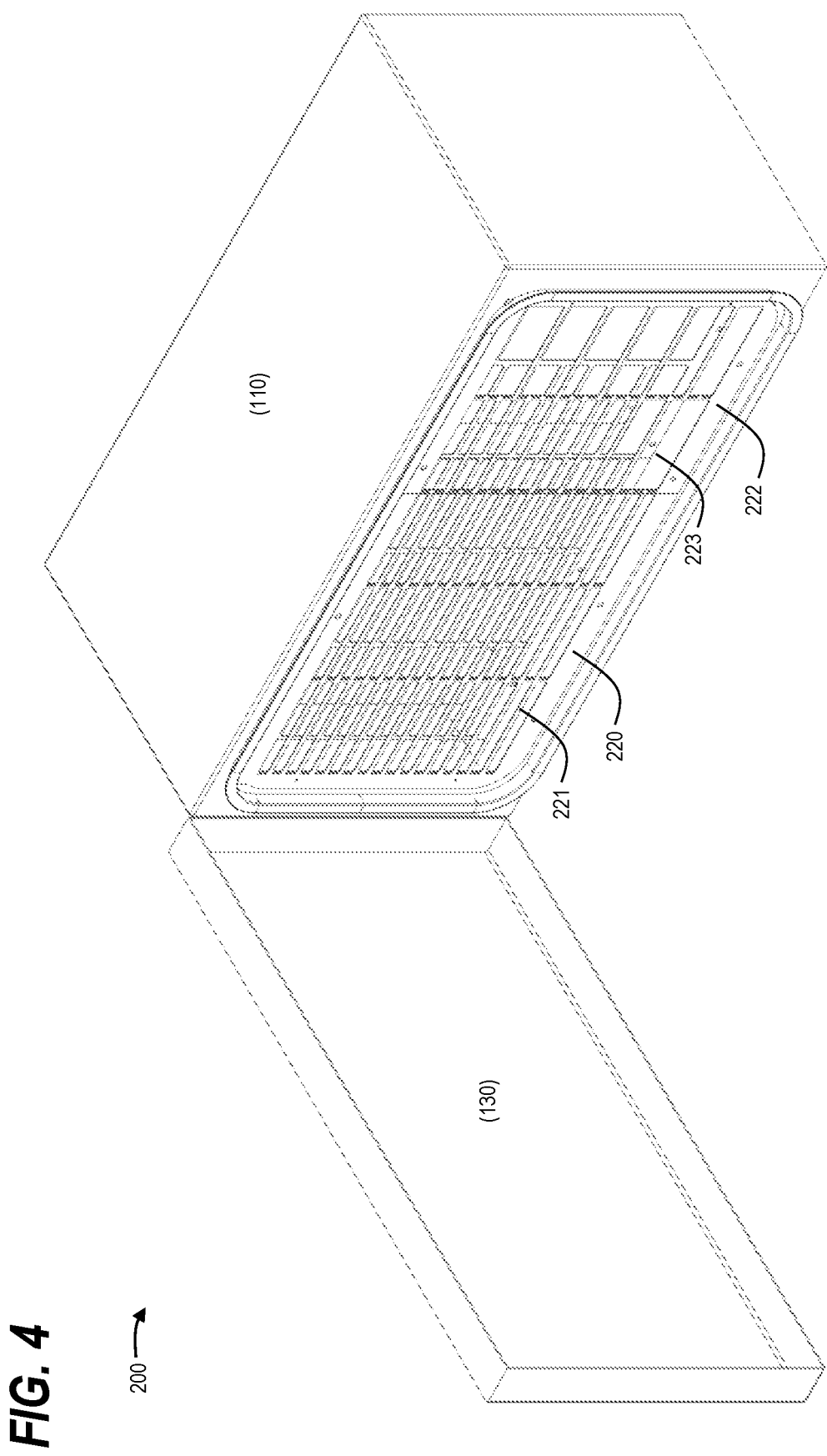
FIG. 4 illustrates a perspective view of an alternative embodiment of FIGS. 1A-2B containing a plurality of battery charging bays configured to store at least two different types of rechargeable batteries within the internal compartment of the enclosure of the battery charging and discharging device.

FIG. 4 illustrates a perspective view of an alternative embodiment from the embodiment disclosed in FIGS. 1A-2B of a battery charging and discharging device 200 containing a plurality of battery charging bays 220, 222 within the internal compartment 116 of the enclosure 110 of the battery charging and discharging device 200. The plurality of battery charging bays may include a first battery storage bay 220 having a plurality of battery storage bay support members 221 for receiving, retaining and releasing a first battery type, e.g., a "1U" (one-unit size) type battery form factor, and a second battery storage bay 222 having a plurality of battery storage bay support members 223 for receiving, retaining and releasing a second battery type, e.g., a "2U" (two-unit size) type battery form factor, and/or a third battery type, e.g., a "3U" (three-unit size) type battery form factor.

Figure 5:
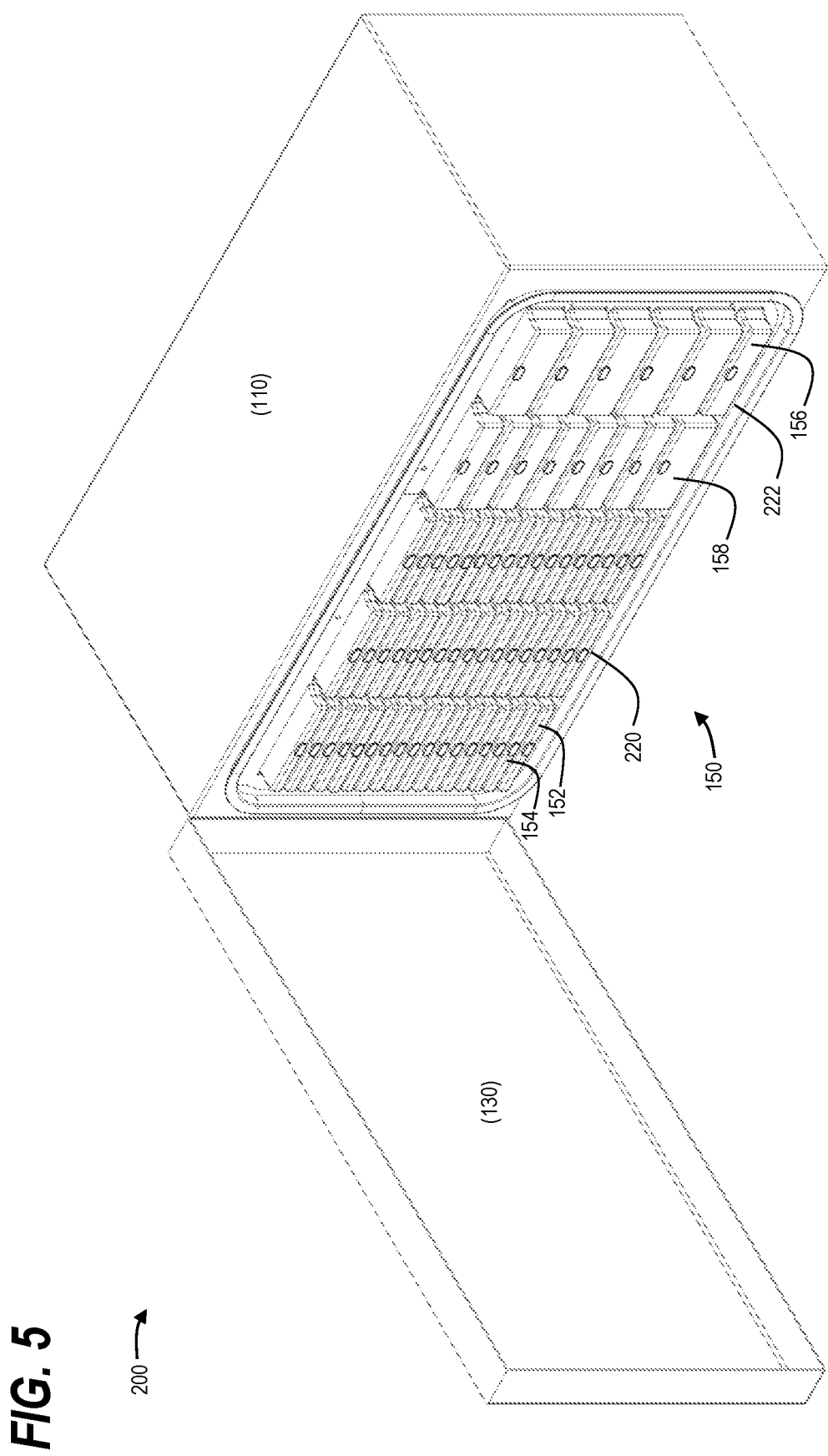
FIG. 5 illustrates a perspective view of the alternative embodiment of FIG. 4 containing the plurality of battery charging bays configured to store at least two different types of rechargeable batteries within the internal compartment of the enclosure of the battery charging and discharging device.

FIG. 5 illustrates a perspective view of the alternative embodiment of FIG. 4 of the battery charging and discharging device 200 containing the first battery charging bay 220 and the second battery charging bay 222 configured to store at least two different types of rechargeable batteries within the internal compartment 116 of the enclosure of the battery charging and discharging device 200. The alternative embodiment of the battery charging and discharging device 200 may be configured to store a plurality of a first form factor type of batteries, e.g., 152 and 154 in the first battery charging bay 220, and a plurality of a second form factor type of batteries, e.g., 156, and a plurality of a third form factor type of batteries, e.g., 158, in the second battery charging bay 222. For example, any number of a single type or a plural types of batteries may be stored in either of the first 220 or second 222 battery charging bays. The purpose of having discrete battery storage charging bays may be to accommodate different needs of the users of the battery charging and discharging device 200. The ability to change battery charging bays between missions or customers allows the same enclosure 110 to be used but to be tailored to specific battery-type recharging needs.

Figure 6:
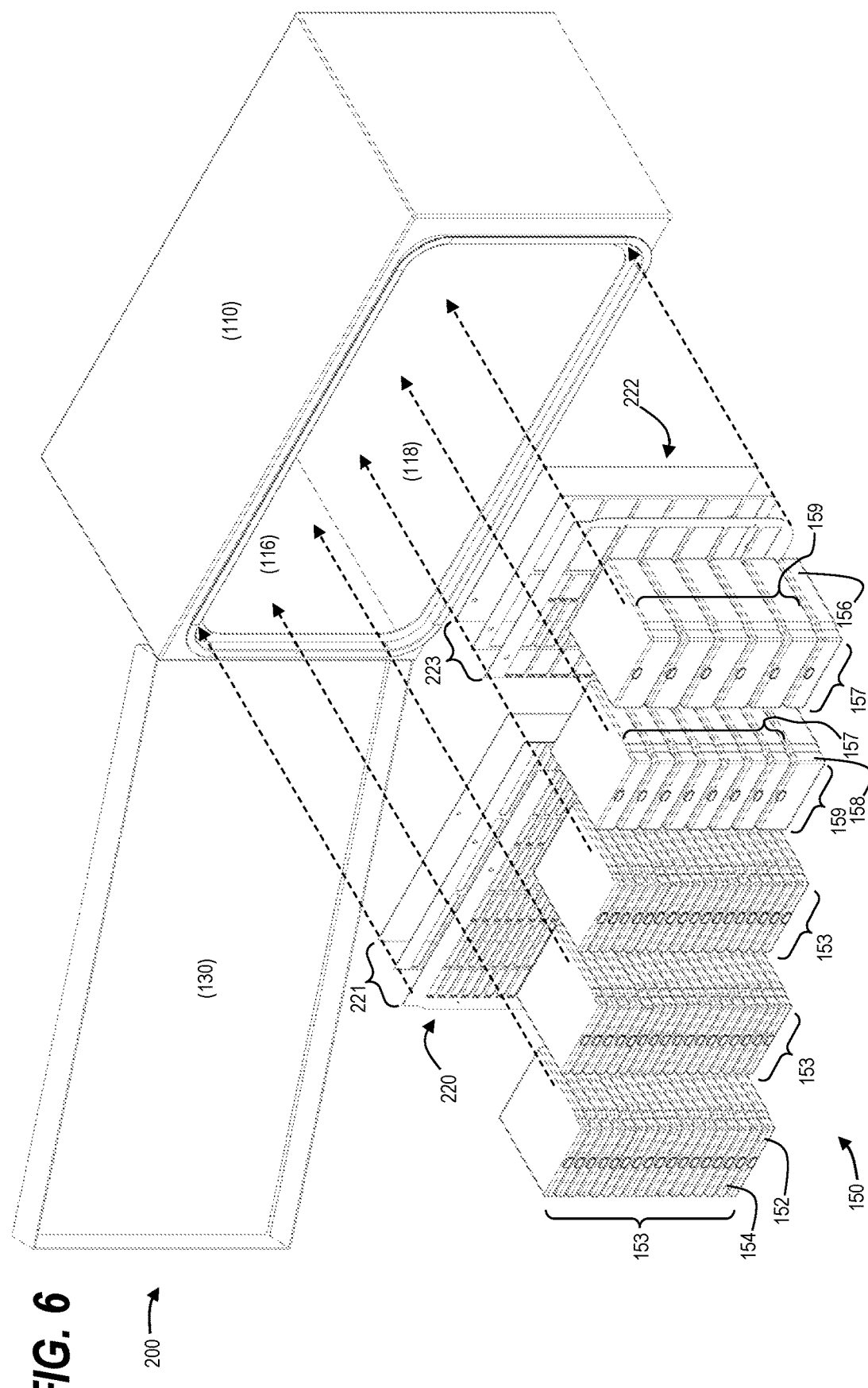
FIG. 6 illustrates a perspective assembly view of the alternative embodiment of FIGS. 4-5 containing the plurality of battery charging bays configured to store at least two different types of rechargeable batteries within the internal compartment of the enclosure of the battery charging and discharging device.

FIG. 6 illustrates a perspective assembly view of the alternative embodiment of FIGS. 4-5 of the battery charging and discharging device 200 containing the plurality of battery charging bays, 220 and 222, configured to store at least two different types of rechargeable batteries within the interior battery storage compartment 118 of the interior compartment 116 of the enclosure 110 of the battery charging and discharging device 200.

For example, a first rechargeable battery 152 having a first form factor type 153, e.g., 1U, and a second rechargeable battery 154 having the same first form factor type 153 in addition to a plurality of rechargeable batteries having the first form factor type 153 are inserted into the battery support members 221 of the battery storage bay 220 which may be retained within the interior battery storage compartment 118 of the enclosure 110.

Furthermore, as an exemplary illustration, another form factor rechargeable battery 156 having a second form factor type 157, e.g., 2U, and a third rechargeable battery 158 having a third form factor type 159 in addition to a plurality of rechargeable batteries having the second and third form factor types are inserted into the battery support members 223 of the battery storage bay 222 which may be retained within the interior battery storage compartment 118 of the enclosure 110.

FIG. 7 illustrates a schematic diagram 700 of the first embodiment of the battery charging and discharging enclosure 100 of FIGS. 1A-3, and the second embodiment of the charging and discharging enclosure 200 of FIGS. 4-6, respectively, included in the enclosure 110 and at least one battery storage bay module, e.g., reference numbers 120, or 220 and 222.

Enclosure 110 includes an access opening 112 having a moveable cover 130 operable to provide a weather-proof seal 114 over the access opening 112 and the interior battery storage compartment 118. A battery storage bay 120 in the first embodiment, and battery storage bay 220 in the second embodiment include a plurality of batteries 150 that may include a first form factor type 153 of battery, two of those first form factor type of batteries may include a first rechargeable battery 152 and a second rechargeable battery 154. In the second embodiment, a second battery storage bay 222 may include a plurality of batteries 150 that may include a second form factor type 157 of batteries and may further include a third form factor type 159 of batteries.

Each of the battery storage bays as disclosed in the two above embodiments may further include a battery charging state visual indicator 124, a battery charge/discharge state indicator 126 and battery charge/discharge state switch 128.

The charging device enclosure 110 of the first 100 and second 200 embodiments of the battery charging and discharging devices further include a power management system 160 configured to supply an electrical charging current to at least a portion of each of the plurality of batteries in the battery storage bays 120, 220 and 222, and configured to discharge stored electrical power from at least a portion of each of the plurality of batteries in the battery storage bays 120, 220 and 222.

An external power supply 182 may be electrically connected to the charging device enclosure 110 via an electrical connection 180, which may in the alternative be a discrete power supply electrical connection 180A, that supplies power to a power/voltage sensing circuit 162. The power/voltage sensing circuit 170 may receive different current and voltage types, e.g., 110 VAC, 220 VAC, 480 VAC, 12 VDC, 24 VDC, 350 VDC nominal, 650 VDC nominal and 800 VDC nominal, and convert these current and voltage types via the known use of transformers, voltage rectifiers and/or voltage regulators to a predetermined voltage amount and type required to supply a predetermined electrical charging current to any batteries in the battery storage bays 1210, 220, 222 of the enclosure 110.

The power/voltage sensing circuit 162 may then supply the charging current to the charging supply network/bus 164 that distributes the charging current to each of a plurality of charge/distribution circuits 166 for supplying the charging current via at least one battery electrical connection 167 to each of the plurality of batteries 150 in the enclosure 110 that are selected or switched to be recharged.

A charge monitoring circuit 168 monitors each pair of charge/distribution circuit and corresponding battery to determine any battery failure and/or charge/distribution circuit failure during any battery charging or discharging state. The charge monitoring circuit 168 may be connected to the visual charge indicator 124 of each respective battery to visually indicate to an operator the failure or operational status of the respective rechargeable battery and charge/distribution circuit: e.g., a battery failure, a battery charge status, a charge/distribution circuit state status, and a charge/distribution circuit failure.

When a particular battery or plurality of batteries has been switched via the charge/discharge switch(es) 128 to discharged stored electrical energy, the charge/discharge control circuit 170 conducts the stored electrical energy to a distribution power network/bus 172 collecting the energy from each charge/distribution circuit 166 to a load supply circuit 174 that may then distribute the discharged stored electrical energy to at least one of an internal electrical load 176, a cooling system 190 configured to cool the power management system 160, and/or a master power switch 178. The master power switch 178 may be engaged only when it may be safe to switch the stored electrical energy to the electrical connection 180 or a dedicated load connection 180B to an external load 184.

A releasable attachment device 140 may be connected to the enclosure 110 to connect the enclosure 110 to one of a movable object 142 or a stationary object 144.

Figure 8B:
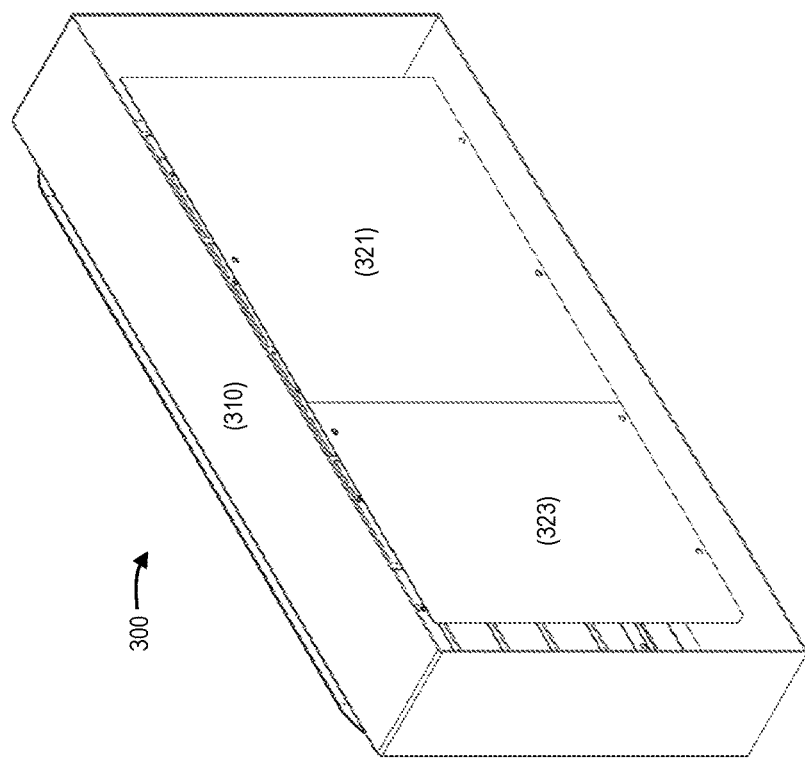
FIG. 8B illustrates a rear perspective view of the third embodiment of the charging and discharging device structure of FIG. 8A.
Figure 8A:
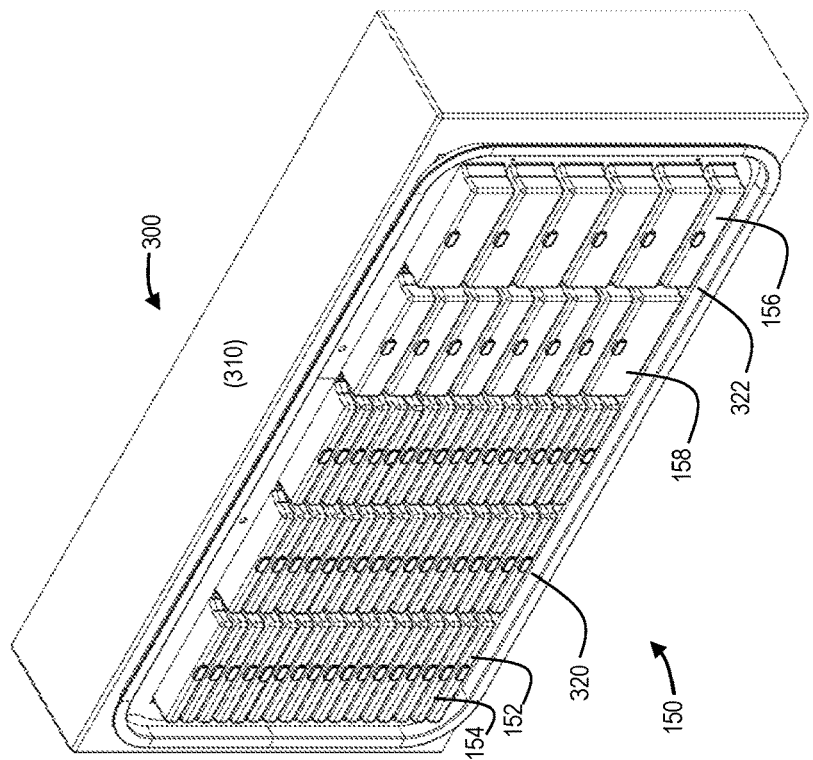
FIG. 8A illustrates a front perspective view of a third embodiment of the charging and discharging device structure including a plurality of batteries stored therein similar to the second embodiment as illustrated in FIGS. 4-6.

FIG. 8A illustrates a front perspective view of a third embodiment of a charging and discharging device 300 including a plurality of batteries 150 stored therein similar to the second embodiment as illustrated in FIGS. 4-6.

The charging and discharging device 300 includes an external structure 310 that may or may not be completely enclosed for applications not requiring weatherproofing of the plurality of batteries 150 and the power management system 160 from an environment.

The alternative embodiment of the battery charging and discharging device 300 may be configured to store a plurality of a first form factor type of batteries, e.g., 152 and 154 in the first battery charging bay 320, and a plurality of a second form factor type of batteries, e.g., 156, and a plurality of a third form factor type of batteries, e.g., 158, in the second battery charging bay 322, similarly illustrated in FIGS. 5 and 6. For example, any number of a single type or a plural types of batteries may be stored in either of the first 320 or second 322 battery charging bays.

FIG. 8B illustrates a rear perspective view of the third embodiment of the charging and discharging device 300 of FIG. 8A where a rear member 321 of the first battery charging bay 320 may be configured to support a discrete power management system 160 and related components on the back thereof for the plurality of batteries, e.g., 152, 154, in the battery storage bay 320. Further, a rear member 323 of the second battery charging bay 322 may be configured to support a corresponding discrete power management system 160 and related components on the back thereof for the plurality of batteries, e.g., 156, 158, etc., in the battery storage bay 322. This configuration may be also be applicable for the second embodiment of the battery charging and discharging enclosure 200 as disclosed in FIGS. 4-6, wherein each battery storage bay may be interchangeably independent from any adjacent battery storage bay during initial assembly and field servicing operations so as to not disrupt the adjacent battery storage bay.

Figure 9:
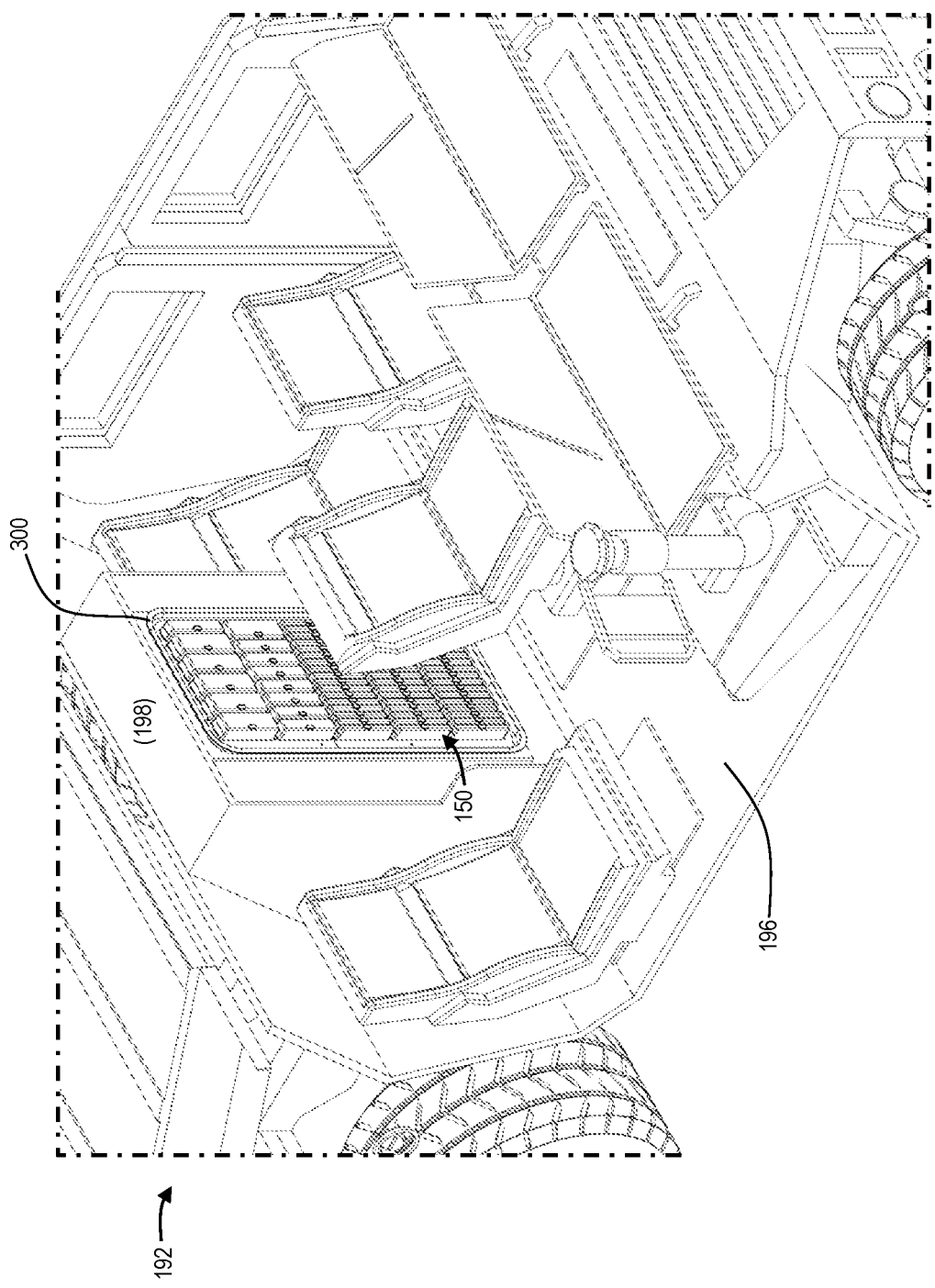
FIG. 9 illustrates an environmental illustration of the battery charging and discharging structure of FIGS. 8A-8B containing the plurality of batteries as affixed to an interior surface a moveable vehicle where the moveable vehicle similar to the moveable vehicle of FIG. 3 and illustrating a partial interior view thereof.

FIG. 9 illustrates an environmental illustration of the battery charging and discharging device 300 of FIGS. 8A-8B containing a plurality of batteries 150 as affixed to an interior surface 198 of an interior compartment 196 a moveable vehicle 192, where the moveable vehicle 192 may be similar to the moveable vehicle of FIG. 3, where FIG. 9 illustrates a partial interior view of the moveable vehicle 192 having its exterior body panels, roof and doors removed to more clearly illustrate the disposition of the battery charging and discharging device 300.

FIG. 10 illustrates a schematic diagram 1000 of the third embodiment of the charging and discharging device 300 of FIGS. 8A-9 included a battery storage compartment 118 and at least one battery storage bay module 320 and 322.

The charging and discharging external structure 310 includes the access opening 112 and the interior battery storage compartment 118 similar to the first and second embodiments of FIGS. 1A-6. A battery storage bay 320 in the third embodiment includes a plurality of batteries 150 that may include a first form factor type 153 of battery, two of those first form factor type of batteries may include a first rechargeable battery 152 and a second rechargeable battery 154. A second battery storage bay 322 may include a plurality of batteries 150 that may include a second form factor type 157 of batteries and may further include a third form factor type 159 of batteries. The multiple battery storage bay configuration of the third embodiment may be similar to the battery storage bays disclosed in the second embodiment as illustrated in FIGS. 4-6.

Each of the battery storage bays as disclosed in the two above embodiments may further include a battery charging state visual indicator 124, a battery charge/discharge state indicator 126 and battery charge/discharge state switch 128.

The charging and discharging external structure 310 of the third embodiment of the battery charging and discharging device 300 may further include at least one power management system 160 configured to supply an electrical charging current to at least a portion of each of the plurality of batteries 150 in the battery storage bays 320 and 322, and configured to discharge stored electrical power from at least a portion of each of the plurality of batteries 150 in the battery storage bays 320 and 322.

An external power supply 182 may be electrically connected to the charging and discharging device external structure 310 via an electrical connection 180, which may be a discrete power supply electrical connection 180A, that supplies power to a power/voltage sensing circuit 162. The power/voltage sensing circuit 162 may receive different current and voltage types, e.g., 110 VAC, 220 VAC, 480 VAC, 12 VDC, 24 VDC, 350 VDC nominal, 650 VDC nominal and 800 VDC nominal, and convert the current and voltage types via the known use of transformers, voltage rectifiers and/or voltage regulators to a predetermined voltage amount and type required to supply a predetermined electrical charging current to any batteries in the battery storage bays 220, 222 in the enclosure 310.

The power/voltage sensing circuit 162 may then supply the charging current to the charging supply network/bus 164 that distributes the charging current to each of a plurality of charge/distribution circuits 166 for supplying the charging current via at least one battery electrical connection 167 to each of the plurality of batteries in the external structure 310 that are selected or switched to be recharged.

A charge monitoring circuit 168 monitors each pair of charge/distribution circuit and corresponding battery to determine any battery or circuit failure or compromise in performance during a battery charging or discharging mode. The charge monitoring circuit 168 may be connected to the visual charge indicator 124 of each respective battery to visually indicate to an operator the failure or operational status of the respective rechargeable battery and charge/distribution circuit: e.g., a battery failure, a battery charge status, a charge/distribution circuit state status, and a charge/distribution circuit failure.

When a particular battery or plurality of batteries has been switched via the charge/discharge switch(es) 128 to discharged stored electrical energy, the charge/discharge control circuit 170 conducts the stored electrical energy to a distribution power network/bus 172 collecting the received battery energy from each charge/distribution circuit 166 to a load supply circuit 174 that may then distribute the discharged stored electrical energy to at least one of an internal electrical load 176, a cooling system 190 configured to cool the power management system 160, and/or a master power switch 178. The master power switch 178 may be engaged only when a determination is made it is safe to switch the stored electrical energy to the electrical connection 180 or in the alternative a dedicated load connection 180B to an external load 184.

A releasable attachment device 140, (as exemplary illustrated in FIG. 3), may be connected to the external structure 310 configured to be connected to and removably attached to one of a movable object 142 or a stationary object 144.

Figure 11:
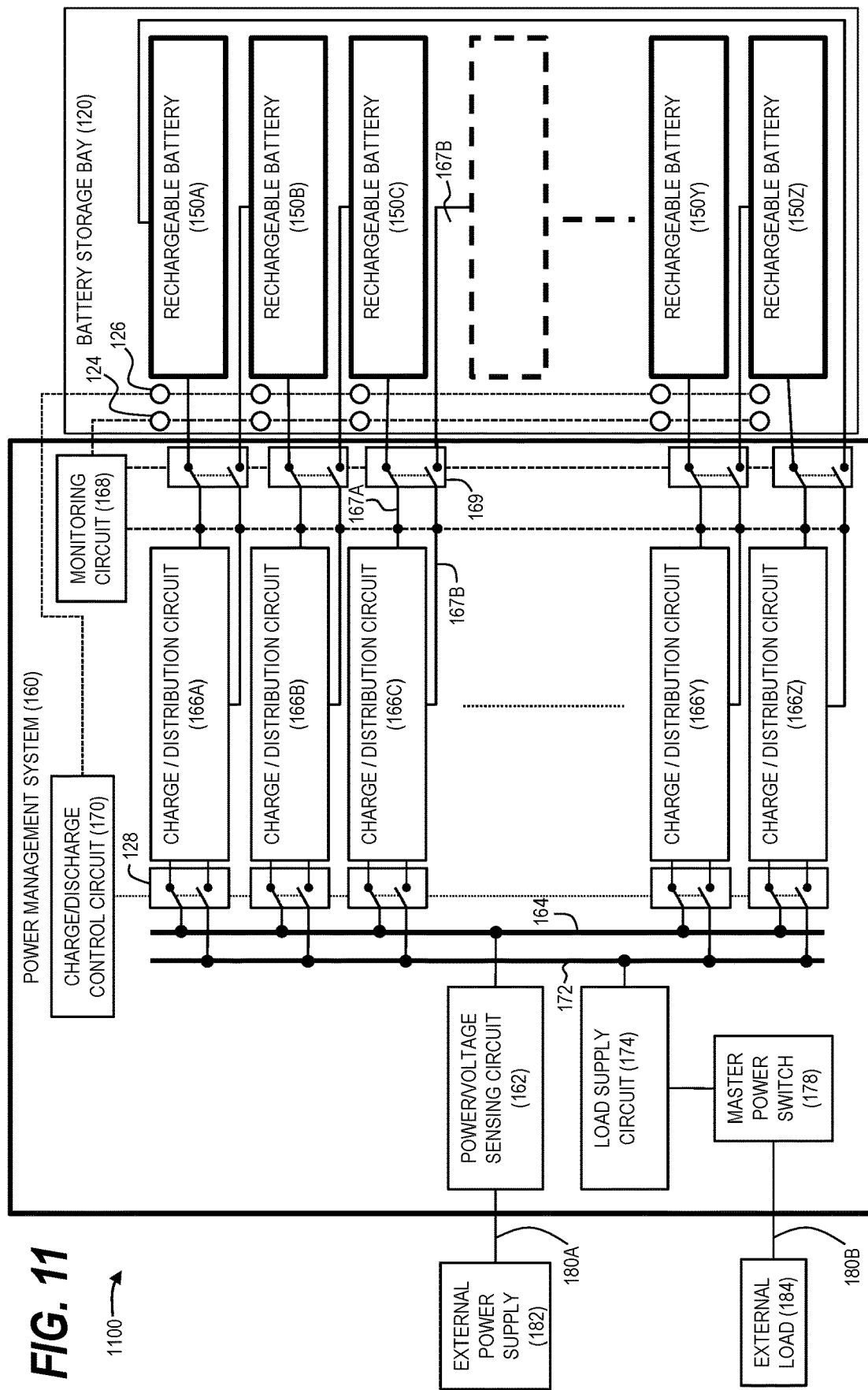
FIG. 11 illustrates a schematic diagram of the power management system of the charging and discharging devices of FIGS. 1-10.

FIG. 11 illustrates a schematic diagram 1100 of the power management system 160 of the charging and discharging device embodiments 100, 200 and 300 as illustrated in FIGS. 1-10.

The power management system 160 may receive electrical power from an external power supply 182 via an electrical connection 180, or a dedicated electrical connection 180A, to a power/voltage sensing circuit 162 configured to convert a voltage amount and power type, (i.e., AC or DC), into a predetermined voltage output and power type required for recharging the plurality of batteries 150 in the charging and discharging enclosure 100, 200 or structure 300.

The power/voltage sensing circuit 162 feeds the converted voltage and power type output to a charging supply network/bus 164 that distributes the electrical current to respective battery charge/discharge state switches 128 associated with each of a plurality of charge/distribution circuits 166. The charge/discharge state switches 128 are controlled by a charge/discharge control circuit 170 configured to independently control each of the charge/discharge state switches 128 to either distribute an electrical current to a respective charge/distribution circuit 166, or route stored electrical energy from a rechargeable battery via a respective charge/distribution circuit 166 to an electrical load.

Each charge/distribution circuit 166 includes at least two battery node connections, for example, a first battery node connection 167A, and a second battery node connection 167B. An alternate embodiment may provide for more the two battery node connections from a single charge/distribution circuit 166 where each of the more than two battery node connections are electrically connected to discrete rechargeable batteries in the battery storage bay(s), e.g., 120, 220, 222, 320, and 322.

Each of the battery node electrical connections, e.g., 167A and 167B, of each battery charge and distribution circuit 166 are connected to a battery node switch 169 controlled by a monitoring circuit 168. The monitoring circuit 168 may be additionally connected to each of the battery node electrical connections configured to monitor both the rechargeable battery 150 and the associated charge/distribution circuit 166 to which it may be electrically connected to.

The monitoring circuit 168 monitors the rechargeable battery 150 to determine at least a charging or discharging state of the battery, a charging status of the battery, e.g., low, medium, high, and completed charging, and at least one of a battery health, a battery overload or a battery fault state. The monitoring circuit 168 may be further connected to a battery charging state visual indicator 124 and a battery charging/discharging state indicator 126 for each rechargeable battery 150 to provide a visual indication of a status of the monitored conditions. In an alternative embodiment, the battery charging state visual indicator 124 and the battery charging/discharging state indicator 126 may be consolidated to multipurpose single visual indicator that may be configured to visually differentiate each of the monitored conditions or operational modes to a user, e.g., via a multicolored LED displaying a plurality of condition indicating colors in combination with further condition indicating pulsing or flashing colored LED displays.

The monitoring circuit 168 additionally monitors the charge/distribution circuit 166 at each of the battery node connections, e.g., 167A and 167B, to determine the presence of and/or any discrepancies in the output charging current being output to the rechargeable batteries 150, and to determine the presence and quality of any discharge current being received from the rechargeable batteries 150.

The monitoring circuit 168, based on detecting any anomaly in either a rechargeable battery 150 or within the charge/distribution circuit 166 itself, may cause an associated battery node switch 169 to connect to one or another of the battery node connections, e.g., 167A and 167B, between the charge/distribution circuit 166 and one or another of the rechargeable batteries 150. For example, if a fault is detected by the monitoring circuit 168 in charge/distribution circuit 166C such that the charge/distribution circuit 166C must be taken off-line, the monitoring circuit 168 may control the corresponding battery node switch 169 to switch a supplied charging current to rechargeable battery 150B from charge/distribution circuit 166B and begin supplying rechargeable battery 150C via its second battery node connection, similar to battery node connection 167B for charge/distribution circuit 166C.

In a similar manner, if the monitoring circuit 168 detects that a rechargeable battery 150 has completed its charging routine and no longer needs any charging current, the monitoring circuit 168 may route the power via the battery nodes switches 169 to supply an available charging current via an available charge/distribution circuit 166. For example, if rechargeable battery 150Z has completed its charging cycle, then the battery node switch 169 associated with the charge/distribution circuit 166Z may be switched so that the charging current may be supplied to rechargeable battery 150A. Coincidently with the activation of the battery node switch 169 associated with the charge/distribution circuit 166Z to accomplish this power redistribution, a plurality of battery nodes switches 169 may be simultaneously switched to index the recharging current from respective charge/distribution circuits 166 to rechargeable batteries determined by the monitoring circuit 168 to still be in a battery recharging cycle/state.

A charge/discharge control circuit 170 may be connected to battery charge/discharge state switches 128 for each combination of charge/distribution circuit 166 and respective rechargeable battery 150. These charge/discharge state switches may be physically accessible to a user for each of the plurality of batteries on the enclosure 110 or external structure 310, and may also be controlled by the charge/discharge control circuit 170 to allow for automatic selection and activation of each battery charge/discharge state switch 128.

When the battery charge/discharge state switch 128 may be switched to supply electrical energy from one or more respective rechargeable batteries 150 through respective charge/distribution circuits 166, the electrical energy may be supplied to the distribution power network/bus 172 and routed to a load supply circuit 174. The load supply circuit 174, as illustrated in FIGS. 7 and 10, may supply the received electrical energy to any internal electrical load 176, e.g., a cooling system 190, and/or supply the electrical energy through a master power switch 178 via an electrical connection 180, e.g., a discrete external connection 180B, to an external load 184. The master power switch 178 may be a user operated switch that may only be operable when the monitoring circuit 168 has determined the electrical energy supplied by the respective rechargeable batteries may be compatible with and sufficient for the electrical demand of the external load.

Figure 12:
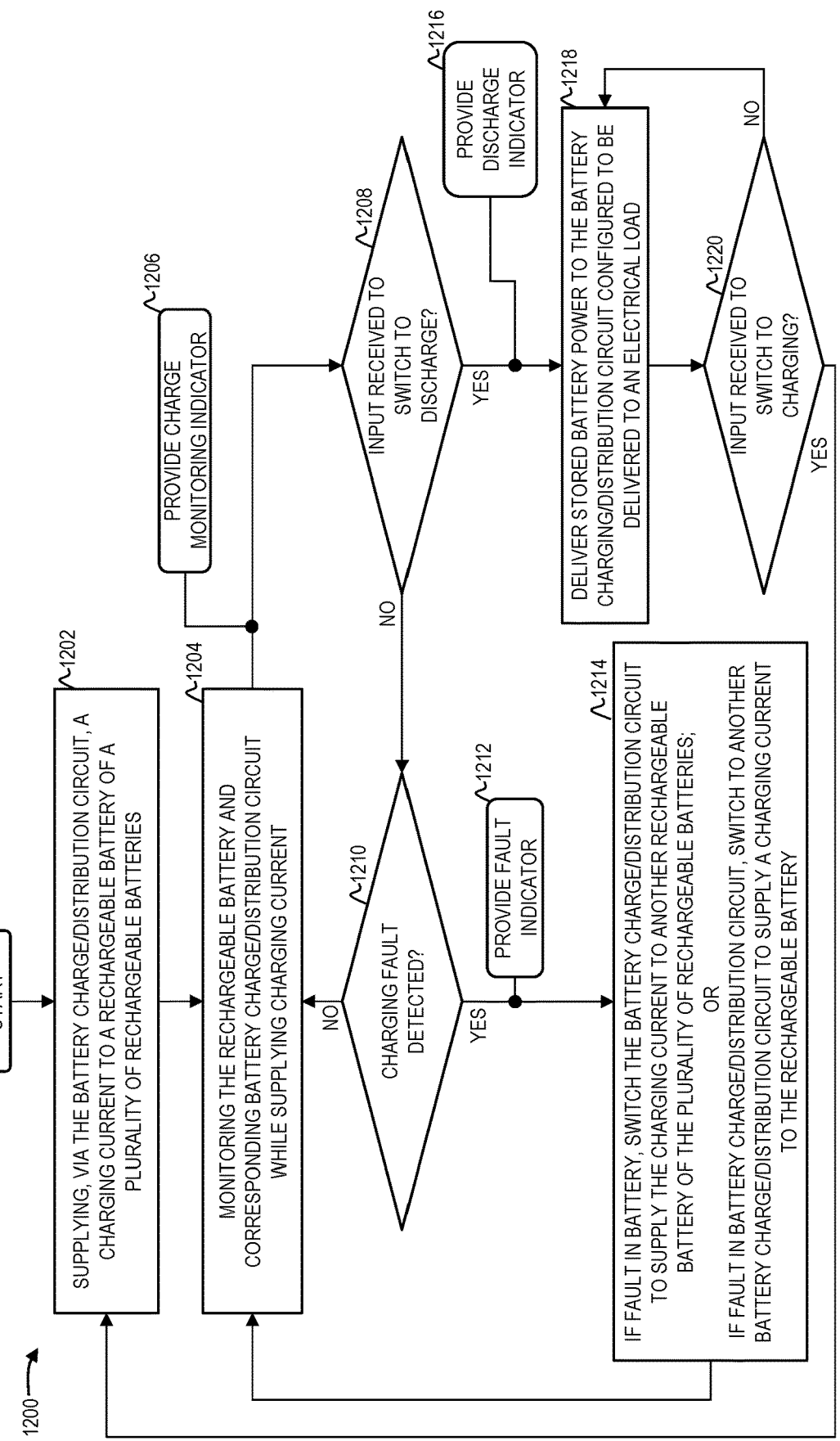
FIG. 12 illustrates a logic flowchart diagram of a method of supplying a charging current to a plurality of batteries by either switching a battery charge/distribution circuit to supply the charging to another rechargeable battery of the plurality of batteries, or switching to another battery charge/distribution circuit to supply the charging current to a rechargeable battery.

FIG. 12 illustrates a logic flowchart diagram of a method 1200 of supplying a charging current to a plurality of batteries by either switching a battery charge/distribution circuit to supply the charging to another rechargeable battery of the plurality of batteries, or switching to another battery charge/distribution circuit to supply the charging current to a rechargeable battery.

The method starts with supplying, via the battery charging/distribution circuit, a charging current to a rechargeable battery of a plurality of rechargeable batteries 1202. The method further includes monitoring the rechargeable battery and corresponding battery charge/distribution circuit while supplying charging current 1204. The monitoring provides a charge monitoring indicator 1206 to a visual indicator device.

The method further includes determining if an input has been received to switch from a battery recharging mode to a battery discharging mode 1208. If no battery discharging mode switch input has been received, then the method determines if a charging fault on either the monitored rechargeable battery and/or the corresponding battery charge/distribution circuit has been detected 1210. If no charging fault has been detected for the monitored rechargeable battery and the corresponding battery charge/distribution circuit, the method reverts to the monitoring step at reference number 1204.

If a charging fault has been detected for the monitored rechargeable battery and/or the corresponding battery charge/distribution circuit, the method provides a fault indicator 1212 at a visual indicator device. If a charging fault has been determined to be in battery, the method includes switching the battery charge/distribution circuit to supply the charging current to another rechargeable battery of the plurality of rechargeable batteries 1214. Or in the alternative, if a charging fault has been determined to be in the battery charge/distribution circuit, the method includes switching to another battery charge/distribution circuit to supply the charging current to the rechargeable battery of the plurality of rechargeable batteries 1214. Thereafter, the method reverts to the monitoring step at reference number 1204.

If at the method step 1208 it has been determining that an input has been received to switch from a battery recharging mode to a battery discharging mode, the method provides a discharge indicator 1216 to a visual indicator device. The method further includes delivering stored battery power to the battery charging/distribution circuit configured to be delivered to an electrical load 1218.

The method further includes determining if an input has been received to switch to a charging mode 1220. If no such input to switch to the charging mode has been received 1220, the method reverts to the method of delivering stored battery power 1218. If such input to switch to the charging mode has been received 1220, the method reverts to the method of supplying a charging current to a rechargeable battery of step 1202.

FIG. 13 illustrates a logic flowchart diagram of a method 1300 of supplying stored battery energy current from at least one battery of a plurality of batteries to an electrical load by either switching from a first battery charge/distribution circuit to another battery charge/distribution circuit, or switching from a first discharging rechargeable battery to another discharging rechargeable battery.

The method starts with receiving, via a battery charging/distribution circuit, a discharge current from a rechargeable battery of a plurality of rechargeable batteries 1302. The method further includes monitoring the rechargeable battery and corresponding battery charge/distribution circuit while receiving the discharge current 1304. The monitoring provides a discharge monitoring indicator 1306 to a visual indicator device.

The method further includes determining if an input has been received to switch from a battery discharging mode to a battery charging mode 1308. If no battery charging mode switch input has been received, then the method determines if a discharging fault on either the monitored rechargeable battery and/or the corresponding battery charge/distribution circuit has been detected 1310. If no discharge fault has been detected for the monitored rechargeable battery and the corresponding battery charge/distribution circuit, the method reverts to the monitoring step at reference number 1304.

If a discharge fault has been detected for the monitored rechargeable battery and/or the corresponding battery charge/distribution circuit, the method provides a discharge fault indicator 1312 at a visual indicator device. If the discharge fault has been determined to be in the battery, the method includes switching the battery charge/distribution circuit to distribute the discharging current from another rechargeable battery of the plurality of rechargeable batteries 1314. Or in the alternative, if discharging fault has been determined to be in the battery charge/distribution circuit, the method includes switching to another battery charge/distribution circuit to receive the discharging current from the rechargeable battery of the plurality of rechargeable batteries 1314. Thereafter, the method reverts to the monitoring step at reference number 1304.

If at the method step 1308, it has been determining that an input has been received to switch from a battery discharging mode to a battery charging mode, the method provides a discharge indicator 1316 to a visual indicator device. The method further includes delivering a charging current via the battery charging/distribution circuit configured to be delivered to the rechargeable battery 1318.

The method further includes determining if an input has been received to switch to a discharging mode 1320. If no such input to switch to the discharging mode has been received 1320, the method reverts to the method of delivering a recharging current to the rechargeable battery 1318. If such input to switch to the discharging mode has been received 1320, the method reverts to the method of receiving a discharging current from at least one rechargeable battery of step 1302.

A further embodiment of a battery charging and discharging device include includes an enclosure defining an interior compartment, where the enclosure further includes an access opening configured to allow access to the interior compartment, a moveable cover configured to move between a closed position covering the access opening and to prevent access to the interior compartment, and an open position enabling access to the interior compartment, a battery storage compartment disposed within the interior compartment and configured to receive, retain and release a plurality of rechargeable batteries, and a releasable attachment device configured to releasably attach the enclosure to one of a movable object or a stationary fixture.

The battery charging and discharging device further includes a power management system disposed within the interior compartment further including a plurality of battery charge and distribution circuits each configured to switch between a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and a battery power supplying mode configured to receive a stored battery power from at least one of the plurality of rechargeable batteries retained in the battery storage compartment and configured to deliver the stored battery power to an external electrical load, and a battery charging monitoring circuit configured to monitor at least one battery of the plurality of rechargeable batteries under the battery charging mode and provide a charging state visual indicator of the monitored battery charging mode associated with the at least one monitored battery, and to switch at least one of the plurality of battery charge and distribution circuits supplying the charging current between one of the first and the second rechargeable batteries.

The battery charging and discharging device further includes the enclosure being configured to environmentally seal the interior compartment, and where the moveable cover may be configured to maintain the environmentally sealed interior compartment when the moveable cover may be in the closed position covering the access opening.

The battery charging and discharging device further includes the enclosure including a structural frame, and at least one removable panel configured to be attached to a portion of the structural frame.

The battery charging and discharging device further including the at least one removeable panel may be further comprised of a replaceable ballistic projectile resistant panel.

The battery charging and discharging device further includes the at least one removable panel further including a spall liner configured to cover a portion of the interior compartment and configured to impede ballistic projectile fragments.

The battery charging and discharging device further including the battery storage compartment further includes a retaining device configured to retain at least one of the plurality of rechargeable batteries within the battery storage compartment.

The battery charging and discharging device further including the retaining device configured to retain at least two of the plurality of rechargeable batteries within the battery storage compartment.

The battery charging and discharging device further includes the retaining device to include the moveable cover configured to retain at least two of the plurality of rechargeable batteries within the battery storage compartment when the moveable cover is in closed position.

The battery charging and discharging device further including at least one of the plurality of battery charge and distribution circuits being further configured to provide a charging state visual indicator during the battery charging mode for at least one of the plurality of rechargeable batteries retained in the battery storage compartment.

The battery charging and discharging device further including each of the plurality of battery charge and distribution circuits may be configured to switch between the first and second rechargeable batteries of the plurality of rechargeable batteries to supply the charging current based on detecting a fault in at least one of the plurality of rechargeable batteries.

The battery charging and discharging device further includes at least one of the plurality of battery charge and distribution circuits may be further configured to allow a selection between the battery charging mode and the battery power supplying mode for at least one of the plurality of rechargeable batteries retained in the battery storage compartment.

The battery charging and discharging device further includes at least one of the battery charge and distribution circuits may be further configured to provide a battery mode visual indicator corresponding to one of the battery charge mode and the battery power supply mode.

The battery charging and discharging device further including a power/voltage sensing circuit configured to sense an input power level from an external electrical source on an electrical connection and convert the input power level to a line charging level configured to provide the charging current compatible with at least one of the plurality of rechargeable batteries retained in the battery storage compartment.

The battery charging and discharging device further including an electrical connection configured to provide an electrically conductive path between the power management system and at least one of an external electrical source or an external electrical load.

The battery charging and discharging device further including the electrical connection includes a first electrically conductive path configured to receive an input power from the external electrical source, and a second electrically conductive path configured to output the stored rechargeable battery power to the external electrical load.

Another embodiment of a battery charging and discharging device includes an enclosure defining an interior compartment, the enclosure further comprising an access opening configured to allow access to the interior compartment, a moveable cover configured to move between a closed position covering the access opening and to prevent access to the interior compartment, and an open position enabling access to the interior compartment, a battery storage compartment disposed within the interior compartment and configured to receive a first battery storage bay module configured to receive, retain and release a first type of a plurality of rechargeable batteries and to receive a second rechargeable battery storage bay module configured to receive, retain and release a second type of the plurality of rechargeable batteries different from the first type of the plurality of rechargeable batteries, and a releasable attachment device configured to releasably attach the enclosure to one of a movable object or a stationary fixture.

The embodiment of a battery charging and discharging device further includes a power management system disposed within the interior compartment further including a plurality of battery charge and distribution circuits each configured to switch between a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and a battery power supplying mode configured to receive a stored rechargeable battery power from at least one of the plurality of rechargeable batteries retained in the battery storage compartment and configured to deliver the stored rechargeable battery power to an external electrical load, and a battery charging monitoring circuit configured to monitor at least one battery of the plurality of rechargeable batteries under the battery charging mode and provide a visual indicator of the monitored battery charging mode associated with the at least one battery, and to switch at least one of the plurality of battery charge and distribution circuits supplying the charging current between one of the first and the second rechargeable batteries.

The battery charging and discharging device further includes each of the plurality of battery charge and distribution circuits may be configured to switch between the first and second rechargeable batteries of the plurality of rechargeable batteries to supply the charging current based on detecting a fault in at least one of the plurality of rechargeable batteries.

The battery charging and discharging device further includes at least one of the plurality of battery charge and distribution circuits may be further configured to allow a selection between the battery charging mode and the battery power supplying mode for at least one of the plurality of rechargeable batteries retained in the battery storage compartment.

The battery charging and discharging device further includes at least one of the battery charge and distribution circuits may be further configured to provide a battery mode visual indicator corresponding to one of the battery charge mode and the battery power supply mode.

Another embodiment of a battery charging and discharging device includes a battery storage compartment configured to receive, retain and release a plurality of rechargeable batteries, and a power management system including a plurality of battery charge and distribution circuits each configured to switch between a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and a battery power supplying mode configured to receive a stored rechargeable battery power from at least one of the plurality of rechargeable batteries retained in the battery storage compartment and configured to deliver the stored rechargeable battery power to an external electrical load, and a battery charging monitoring circuit configured to monitor at least one battery of the plurality of rechargeable batteries under the battery charging mode and provide a visual indicator of the monitored battery charging mode associated with the at least one battery, and to switch at least one of the plurality of battery charge and distribution circuits supplying the charging current between one of the first and the second rechargeable batteries.

The battery charging and discharging device further includes the battery storage compartment may be configured to receive a first battery storage bay module configured to receive, retain and release a first type of the plurality of rechargeable batteries, and to receive a second battery storage bay module configured to receive, retain and release a second type of the plurality of rechargeable batteries different from the first type of the plurality of rechargeable batteries.

The battery charging and discharging device further includes each of the plurality of battery charge and distribution circuits may be configured to switch between the first and second rechargeable batteries of the plurality of rechargeable batteries to supply the charging current based on detecting a fault in at least one of the plurality of rechargeable batteries.

The battery charging and discharging device further includes at least one of the plurality of battery charge and distribution circuits may be further configured to allow a selection between the battery charging mode and the battery power supplying mode for at least one of the plurality of rechargeable batteries retained in the battery storage compartment.

The battery charging and discharging device further includes at least one of the battery charge and distribution circuits may be further configured to provide a battery mode visual indicator corresponding to one of the battery charge mode and the battery power supply mode.

The battery charging and discharging device further includes a releasable attachment device configured to releasably attach the battery charging and discharging device to one of a movable object or a stationary fixture.

Another embodiment of a method of charging and distributing power between a plurality of rechargeable batteries includes providing a battery charging circuit configured to supply a charging current at a first time to a first rechargeable battery of the plurality of rechargeable batteries, and to provide the charging current at a second time to a second rechargeable battery of the plurality of rechargeable batteries, supplying the charging current at the first time to the first rechargeable battery of the plurality of rechargeable batteries, switching, at the second time, the battery charging circuit to supply the charging current to the second rechargeable battery of the plurality of rechargeable batteries, providing a battery power supplying circuit configured to receive a stored rechargeable battery power from at least one of the plurality of rechargeable batteries, and to deliver the stored rechargeable battery power to an electrical load; and switching between one of supplying the charging current to one of the first rechargeable battery or the second rechargeable battery of the plurality of rechargeable batteries, and receiving the stored battery power from the one of the first rechargeable battery or the second rechargeable battery of the plurality of rechargeable batteries to enable delivery of the received stored battery power to the electrical load.

The method further includes monitoring at least one of the first rechargeable battery and the second rechargeable battery of the plurality of rechargeable batteries while supplying the charging current, and providing, based on the monitoring, a charging state visual indicator of the at least one of the first rechargeable battery and the second rechargeable battery of the plurality of rechargeable batteries.

The method further includes monitoring at least one of the first rechargeable battery and the second rechargeable battery of the plurality of rechargeable batteries while supplying the charging current, detecting a fault when supplying the charging current to one of the first rechargeable battery or the second rechargeable battery of the plurality of rechargeable batteries, wherein the switching the battery charging circuit to supply the charging current to the other of the first rechargeable battery or the second rechargeable battery of the plurality of rechargeable batteries may be responsive to the detected fault.

The method further includes providing a battery mode visual indicator configured to identify when at least one battery of the plurality of rechargeable batteries may be one of being supplied with the charging current or delivering the stored battery power to the electrical load.

The method further includes providing a power/voltage sensing circuit configured to sense an input power level from an external electrical source on an electrical connection, and to convert the input power level to a line charging level configured to provide the charging current compatible with at least one of the plurality of rechargeable batteries.

The method further includes providing a first rechargeable battery storage bay module configured to receive, retain and release a first type of the plurality of rechargeable batteries, and providing a second rechargeable battery storage bay module configured to receive, retain and release a second type of the plurality of rechargeable batteries different from the first type of the plurality of rechargeable batteries, wherein the first and second rechargeable battery storage bay modules are configured to at least one of connect with the battery charging circuit and the battery power supplying circuit, or incorporate a respective battery charging circuit and a battery power supplying circuit.

Another embodiment of a method of charging and distributing power between a plurality of rechargeable batteries connected to a power management circuit includes providing a battery charging circuit configured to be connected to at least two of the plurality of rechargeable batteries, supplying, via the battery charging circuit, a charging current to a first rechargeable battery of the plurality of rechargeable batteries, monitoring the first rechargeable battery while receiving the supplied charging current, detecting a charging fault in response to monitoring the first rechargeable battery receiving the supplied charging current, switching, in response to the detected charging fault of the first battery, the battery charging circuit to supply the charging current via to the second rechargeable battery of the plurality of rechargeable batteries, providing a battery discharge circuit configured to receive a stored rechargeable battery power from at least one of the plurality of rechargeable batteries, detecting a first user input to cause the at least one of the plurality of rechargeable batteries to discharge stored rechargeable battery power to an electrical load, and receiving a second input to cause the at least one of the plurality of rechargeable batteries to receive, via the battery charging circuit, the charging current.

The method of charging and distributing power further includes receiving each individual battery of the plurality of rechargeable batteries independently of one another when connecting to the power management circuit, retaining each individual battery of the plurality of rechargeable batteries when connected to the power management circuit, wherein each individual battery of the retained plurality of rechargeable batteries are configured to be supplied with the charging current and are configured to discharge a stored power therefrom independently of one another, and releasing each individual battery of the plurality of rechargeable batteries independently of one another when disconnecting from the power management circuit.

The method of charging and distributing power further including connecting the battery charging circuit to more than two of the plurality of rechargeable batteries.

The method of charging and distributing power further includes distributing the stored rechargeable battery power from the at one of the plurality of rechargeable batteries to the electrical load.

The method of charging and distributing power further including receiving the stored rechargeable battery power from at least two of the plurality of rechargeable batteries and distributing the stored rechargeable battery power from the at least two of the plurality of rechargeable batteries to the electrical load.

The method of charging and distributing power further including detecting the first user input causes at least two of the plurality of rechargeable batteries to discharge stored rechargeable battery power to the electrical load.

The method of charging and distributing power further including detecting the first user input includes detecting a plurality number of user inputs corresponding to a respective plural number of the plurality of rechargeable batteries.

The method of charging and distributing power further including providing the charging current to one of the plurality of rechargeable batteries at a first time and discharging the stored rechargeable power from another one of the plurality of rechargeable batteries during the same first time.

Another embodiment of a method of charging and distributing power between a plurality of rechargeable batteries connected to a power management circuit includes supplying, via a battery charge and distribution circuit, a charging current to at least one of a plurality of rechargeable batteries, and monitoring, via a monitoring circuit, the at least one of the plurality of rechargeable batteries and the battery charge and distribution circuit concurrently with supplying the charging current.

The method further includes at least one of determining, by the monitoring circuit, a charging fault in the at least one of the plurality of rechargeable batteries, and based on determining the charging fault in the at least one of the plurality of rechargeable batteries, switching the battery charge and distribution circuit to supply the charging current to another one of the plurality of rechargeable batteries, and determining, by the monitoring circuit, a charging fault in the battery charge and distribution circuit, and based on determining the charging fault in the battery charge and distribution circuit, switching to another battery charge and distribution circuit to supply the charging current to the at least one of the plurality of rechargeable batteries.

The method of charging and distributing power further includes providing a charge monitoring indicator to an indication device, the charge monitoring indicator configured to represent at least one of a state of charge indication and a fault indication of one of the at least one of the plurality of rechargeable batteries and the battery charge and distribution circuit.

The method of charging and distributing power further includes determining if an input has been received configured to stop the supplying of charging current to the at least one of the plurality of rechargeable batteries and to switch to receiving a distribution current from the at least one of the plurality of rechargeable batteries.

Another embodiment of a method of charging and distributing power between a plurality of rechargeable batteries connected to a power management circuit includes receiving, via a battery charge and distribution circuit, a discharge current from at least one of a plurality of rechargeable batteries, and monitoring, via a monitoring circuit, the at least one of the plurality of rechargeable batteries and the battery charge and distribution circuit concurrently receiving the discharge current. and The method of charging and distributing power further includes at least one of determining, by the monitoring circuit, a discharge fault in the at least one of the plurality of rechargeable batteries, and based on determining the discharge fault in the at least one of the plurality of rechargeable batteries, switching the battery charge and distribution circuit to receive another discharge current from another of the plurality of rechargeable batteries, and determining, by the monitoring circuit, a discharge fault in the battery charge and distribution circuit, and based on determining the discharge fault in the battery charge and distribution circuit, switching to another battery charge and distribution circuit to receive the discharge current from the at least one of the plurality of rechargeable batteries.

The method of charging and distributing power further includes providing a discharge monitoring indicator to an indication device, the discharge monitoring indicator configured to represent at least one of a state of discharge indication and a discharge fault indication of one of the at least one of the plurality of rechargeable batteries and the battery charge and distribution circuit.

The method of charging and distributing power further includes determining if an input has been received configured to stop the supplying of discharging current from the at least one of the plurality of rechargeable batteries and to switch to providing a charging current to the at least one of the plurality of batteries.

The embodiments disclosed herein provide a portable charging and discharge battery device configured to charge CWB and non-CWB rechargeable batteries in the field using a common power supply in a dense, or high battery count per charging device, charging structure that may be weatherproof and securely and removably attached to a stationary or movable object.

Additionally, the embodiments disclosed herein provide for portable in-the-field power that may be supplied by the portable charging and discharge battery device when one or more batteries retained in the device are switched to deliver their corresponding battery power, and may in consonant with battery power from other retained batteries, be configured to deliver the consolidated battery power to an internal or an external electrical load.

Furthermore, the embodiments disclosed herein provide a rechargeable battery charging device to have modular battery storage compartments or bays pre-configured to receive, retain and release any number of rechargeable batteries in any number of predetermined form factors or sizes.

The foregoing description, for purpose of explanation, has been described with reference to specific arrangements and configurations. However, the illustrative examples provided herein are not intended to be exhaustive or to limit embodiments of the disclosed subject matter to the precise forms disclosed. Many modifications and variations are possible in view of the disclosure provided herein. The embodiments and arrangements were chosen and described in order to explain the principles of embodiments of the disclosed subject matter and their practical applications. Various modifications may be used without departing from the scope or content of the disclosure and claims presented herein.

What is claimed is:

1. A battery charging and discharging device comprising:
    an enclosure defining an interior compartment, the enclosure further comprising
        an access opening configured to allow access to the interior compartment,
        a moveable cover configured to move between a closed position covering the access opening and to prevent access to the interior compartment, and an open position enabling access to the interior compartment,
        a battery storage compartment disposed within the interior compartment and configured to receive, retain and release a plurality of rechargeable batteries, and
        a releasable attachment device configured to releasably attach the enclosure to one of a movable object or a stationary fixture; and
    a power management system disposed within the interior compartment further including
        a plurality of battery charge and distribution circuits each including a user accessible charge/discharge state switch configured to independently switch each battery of the plurality of rechargeable batteries between
            a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and
            a battery power supplying mode configured to receive a stored battery power from at least one of the plurality of rechargeable batteries retained in the battery storage compartment and configured to deliver the stored battery power to an external electrical load, and
        a battery charging monitoring circuit configured
            to monitor at least one battery of the plurality of rechargeable batteries under the battery charging mode and provide a charging state visual indicator of the monitored battery charging mode associated with the at least one monitored battery, and
            to switch at least one of the plurality of battery charge and distribution circuits supplying the charging current between one of the first and the second rechargeable batteries.

2. The battery charging and discharging device of claim 1, wherein the enclosure is configured to environmentally seal the interior compartment, and wherein the moveable cover is configured to maintain the environmentally sealed interior compartment when the moveable cover is in the closed position covering the access opening.

3. The battery charging and discharging device of claim 1, wherein the enclosure further comprises:
    a structural frame; and
    at least one removable panel configured to be attached to a portion of the structural frame.

4. The battery charging and discharging device of claim 3, wherein the at least one removeable panel is further comprised of a replaceable ballistic projectile resistant panel.

5. The battery charging and discharging device of claim 3, wherein the at least one removeable panel further includes a spall liner configured to cover a portion of the interior compartment and configured to impede ballistic projectile fragments.

6. The battery charging and discharging device of claim 1, wherein the battery storage compartment further comprises:
    a retaining device configured to retain at least one of the plurality of rechargeable batteries within the battery storage compartment.

7. The battery charging and discharging device of claim 6, wherein the retaining device is further configured to retain at least two of the plurality of rechargeable batteries within the battery storage compartment.

8. The battery charging and discharging device of claim 6, wherein the retaining device including the moveable cover is configured to retain at least two of the plurality of rechargeable batteries within the battery storage compartment when the moveable cover is in closed position.

9. The battery charging and discharging device of claim 1, wherein at least one of the plurality of battery charge and distribution circuits is further configured to provide a charging state visual indicator during the battery charging mode for at least one of the plurality of rechargeable batteries retained in the battery storage compartment.

10. The battery charging and discharging device of claim 1, wherein each of the plurality of battery charge and distribution circuits is configured to switch between the first and second rechargeable batteries of the plurality of rechargeable batteries to supply the charging current based on detecting a fault in at least one of the plurality of rechargeable batteries.

11. The battery charging and discharging device of claim 1, wherein the user accessible charge/discharge state switch is further configured to allow a selection between the battery charging mode for at least one of the plurality of rechargeable batteries and the battery power supplying mode for at least another one of the plurality of rechargeable batteries retained in the battery storage compartment at the same time.

12. The battery charging and discharging device of claim 11, wherein at least one of the battery charge and distribution circuits is further configured to provide a battery mode visual indicator corresponding to one of the battery charge mode and the battery power supply mode.

13. The battery charging and discharging device of claim 1, further comprising a power/voltage sensing circuit configured to sense an input power level from an external electrical source on an electrical connection and convert the input power level to a line charging level configured to provide the charging current compatible with at least one of the plurality of rechargeable batteries retained in the battery storage compartment.

14. The battery charging and discharging device of claim 1, further comprising an electrical connection configured to provide an electrically conductive path between the power management system and at least one of an external electrical source or an external electrical load.

15. The battery charging and discharging device of claim 14, wherein the electrical connection comprises:
a first electrically conductive path configured to receive an input power from the external electrical source; and
a second electrically conductive path configured to output the stored rechargeable battery power to the external electrical load.

16. A battery charging and discharging device comprising:
an enclosure defining an interior compartment, the enclosure further comprising
an access opening configured to allow access to the interior compartment,
a moveable cover configured to move between a closed position covering the access opening and to prevent access to the interior compartment, and an open position enabling access to the interior compartment,
a battery storage compartment disposed within the interior compartment and configured
to receive a first battery storage bay module configured to receive, retain and release a first type of a plurality of rechargeable batteries and
to receive a second rechargeable battery storage bay module configured to receive, retain and release a second type of the plurality of rechargeable batteries different from the first type of the plurality of rechargeable batteries, and
a releasable attachment device configured to releasably attach the enclosure to one of a movable object or a stationary fixture; and
a power management system disposed within the interior compartment further including
a plurality of battery charge and distribution circuits each including a user accessible charge/discharge state switch configured to independently switch each battery of the plurality of rechargeable batteries between
a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and
a battery power supplying mode configured to receive a stored rechargeable battery power from at least one of the plurality of rechargeable batteries retained in the battery storage compartment and configured to deliver the stored rechargeable battery power to an external electrical load, and
a battery charging monitoring circuit configured
to monitor at least one battery of the plurality of rechargeable batteries under the battery charging mode and provide a visual indicator of the monitored battery charging mode associated with the at least one battery, and
to switch at least one of the plurality of battery charge and distribution circuits supplying the charging current between one of the first and the second rechargeable batteries.

17. The battery charging and discharging device of claim 16, wherein each of the plurality of battery charge and distribution circuits is configured to switch between the first and second rechargeable batteries of the plurality of rechargeable batteries to supply the charging current based on detecting a fault in at least one of the plurality of rechargeable batteries.

18. The battery charging and discharging device of claim 16, wherein the user accessible charge/discharge state switch is further configured to allow a selection between the battery charging mode for at least one of the plurality of rechargeable batteries and the battery power supplying mode for at least another one of the plurality of rechargeable batteries retained in the battery storage compartment at the same time.

19. The battery charging and discharging device of claim 18, wherein at least one of the battery charge and distribution circuits is further configured to provide a battery mode visual indicator corresponding to one of the battery charge mode and the battery power supply mode.

20. A battery charging and discharging device comprising:
a battery storage compartment configured to receive, retain and release a plurality of rechargeable batteries; and
a power management system including
a plurality of battery charge and distribution circuits each including a user accessible charge/discharge state switch configured to independently switch each battery of the plurality of rechargeable batteries between
a battery charging mode configured to supply a charging current at a first time to a first rechargeable battery of the plurality of rechargeable batteries retained in the battery storage compartment, and to provide the charging current at a second time to a second rechargeable battery of the plurality of rechargeable batteries retained in the battery storage compartment, and
a battery power supplying mode configured to receive a stored rechargeable battery power from at least one of the plurality of rechargeable batteries retained in the battery storage compartment and configured to deliver the stored rechargeable battery power to an external electrical load, and
a battery charging monitoring circuit configured
to monitor at least one battery of the plurality of rechargeable batteries under the battery charging mode and provide a visual indicator of the monitored battery charging mode associated with the at least one battery, and
to switch at least one of the plurality of battery charge and distribution circuits supplying the charging current between one of the first and the second rechargeable batteries.

21. The battery charging and discharging device of claim 20, wherein the battery storage compartment is configured
to receive a first battery storage bay module configured to receive, retain and release a first type of the plurality of rechargeable batteries, and
to receive a second battery storage bay module configured to receive, retain and release a second type of the plurality of rechargeable batteries different from the first type of the plurality of rechargeable batteries.

22. The battery charging and discharging device of claim 20, wherein each of the plurality of battery charge and distribution circuits is configured to switch between the first and second rechargeable batteries of the plurality of rechargeable batteries to supply the charging current based on detecting a fault in at least one of the plurality of rechargeable batteries.

23. The battery charging and discharging device of claim 20, wherein the user accessible charge/discharge state switch is further configured to allow a selection between the battery charging mode for at least one of the plurality of rechargeable batteries and the battery power supplying mode for at least another one of the plurality of rechargeable batteries retained in the battery storage compartment at the same time.

24. The battery charging and discharging device of claim 23, wherein at least one of the battery charge and distribution circuits is further configured to provide a battery mode visual indicator corresponding to one of the battery charge mode and the battery power supply mode.

25. The battery charging and discharging device of claim 20, further comprising a releasable attachment device configured to releasably attach the battery charging and discharging device to one of a movable object or a stationary fixture.

* * * * *